US009250927B2

(12) United States Patent
Jung

(10) Patent No.: US 9,250,927 B2
(45) Date of Patent: Feb. 2, 2016

(54) DIGITAL RECEIVER AND METHOD FOR CONTROLLING THE SAME

(75) Inventor: Daeyoung Jung, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 77 days.

(21) Appl. No.: 13/459,699

(22) Filed: Apr. 30, 2012

(65) Prior Publication Data

US 2012/0274852 A1 Nov. 1, 2012

Related U.S. Application Data

(60) Provisional application No. 61/480,383, filed on Apr. 29, 2011.

(30) Foreign Application Priority Data

Jul. 21, 2011 (KR) ........................ 10-2011-0072582

(51) Int. Cl.
*G06F 9/44* (2006.01)
*H04N 21/431* (2011.01)
*H04N 21/434* (2011.01)
*H04N 21/4402* (2011.01)
(Continued)

(52) U.S. Cl.
CPC .......... *G06F 9/4443* (2013.01); *H04N 21/4316* (2013.01); *H04N 21/4345* (2013.01); *H04N 21/4438* (2013.01); *H04N 21/440263* (2013.01); *H04N 21/4788* (2013.01); *H04N 21/47205* (2013.01); *H04N 21/6131* (2013.01); *H04N 21/4722* (2013.01); *H04N 21/4782* (2013.01);

(Continued)

(58) Field of Classification Search
CPC .. H04N 21/47; H04N 21/482; H04N 21/4788
USPC .................. 725/32, 43, 44, 51, 53, 61, 40, 46
See application file for complete search history.

(56) References Cited

U.S. PATENT DOCUMENTS 5,640,498 A * 6/1997 Chew .................... G06F 3/0481
715/790
5,910,802 A * 6/1999 Shields ................. G06F 3/0488
345/173

(Continued)

FOREIGN PATENT DOCUMENTS

CN 101077014 A 11/2007
WO WO 2006/020560 A2 2/2006

OTHER PUBLICATIONS

Anonymous: "Printing with Drag & Drop—Microsoft Community" Jan. 8, 2011, XP055223384.

*Primary Examiner* — Hunter B Lonsberry
*Assistant Examiner* — Alexander Q Huerta
(74) *Attorney, Agent, or Firm* — Birch, Stewart, Kolasch & Birch, LLP

(57) ABSTRACT

A method of controlling a digital apparatus, and which includes displaying, on a display of the digital apparatus, at least first and second display regions, the first display region configured to display a broadcast program and the second display region displaying social network contents; receiving, via an input unit of the digital apparatus, a selection signal indicating a selection of at least a part of the displayed social network contents; converting, via a controller of the digital apparatus, the selected part of the social network contents into image data; receiving, via the input unit, a moving signal indicating a movement of the converted image data on the display; and executing, via the controller, a predetermined application based on the movement of the image data.

11 Claims, 25 Drawing Sheets

(51) Int. Cl.
  *H04N 21/443* (2011.01)
  *H04N 21/472* (2011.01)
  *H04N 21/4788* (2011.01)
  *H04N 21/61* (2011.01)
  H04N 21/4722 (2011.01)
  H04N 21/4782 (2011.01)
  H04N 21/482 (2011.01)

(52) U.S. Cl.
  CPC ........ *H04N 21/47217* (2013.01); *H04N 21/482* (2013.01)

(56) References Cited

U.S. PATENT DOCUMENTS

| | | | |
|---|---|---|---|
| 6,141,003 A * | 10/2000 | Chor | H04N 5/44543 348/E5.104 |
| 6,816,628 B1 | 11/2004 | Sarachik et al. | |
| 7,911,497 B2 | 3/2011 | Russell et al. | |
| 2002/0049978 A1 * | 4/2002 | Rodriguez et al. | 725/86 |
| 2002/0056098 A1 * | 5/2002 | White | 725/39 |
| 2003/0226146 A1 * | 12/2003 | Thurston et al. | 725/46 |
| 2004/0231003 A1 * | 11/2004 | Cooper et al. | 725/135 |
| 2005/0021202 A1 | 1/2005 | Russell et al. | |
| 2005/0183017 A1 * | 8/2005 | Cain | 715/719 |
| 2008/0066111 A1 * | 3/2008 | Ellis et al. | 725/57 |
| 2008/0115169 A1 | 5/2008 | Ellis et al. | |
| 2009/0013347 A1 * | 1/2009 | Ahanger et al. | 725/36 |
| 2009/0298418 A1 * | 12/2009 | Michael et al. | 455/3.04 |
| 2010/0205559 A1 * | 8/2010 | Rose | 715/781 |
| 2012/0144423 A1 * | 6/2012 | Kim | H04N 21/47 725/39 |
| 2013/0276051 A1 * | 10/2013 | Michael | H04N 21/431 725/131 |

* cited by examiner

DIGITAL RECEIVER AND METHOD FOR CONTROLLING THE SAME

This application claims priority benefit to U.S. Provisional Patent Application No. 61/480,383, filed on Apr. 29, 2011, and to Korean Patent Application No. 10-2011-0072582, filed on Jul. 21, 2011, which are hereby incorporated by reference in its entirety.

BACKGROUND OF THE INVENTION

1. Field of the Invention

The present invention generally relates to a digital receiver and a method for controlling the same.

2. Discussion of the Related Art

Modern digital broadcasts now provide images with an improved data resolution, and also include improved noise cancellation and error-correction techniques. Bi-directional digital broadcast service offerings are also becoming popular.

In more detail, the internet protocol television (IPTV) broadcasting allows for streaming digital broadcasts of various Content on Demand (CoD), which is facilitated by communications over one or more IP-based networks, as well as various traditional terrestrial, satellite, and cable broadcast networks.

With the evolution of digital broadcast communications, many modern receiver-type device manufacturers are attempting to manufacture and provide digital receivers that can perform various functions or operations that were not achievable by previous broadcast receivers. However, complicated and various functions included in the digital receivers often require the user needs to refer to a manual in order to execute a desired function through multiple steps.

Furthermore, in the supermarket environment, non-digital shopping carts are used, and the final payment process for the selected products is performed and processed by a large number of employees. This inconveniences the customer.

SUMMARY OF THE INVENTION

Accordingly, one object of the present invention is to address the above-noted and other limitations and disadvantages of the related art.

Another embodiment of the present invention is to provide a digital receiver and a method for providing a user interface by which a user can easily access and use a digital receiver.

Yet another embodiment of the present invention is to provide a digital receiver and a method for controlling the same in which the user can select information in a SNS display window so as to have the selected information converted into image data. Then, the user can drag or move the converted image data into a designated application to execute the designated application using the converted image data. The user can also drag the converted image data into a main display region to execute a predetermined function (e.g., channel change, etc.) in the main display region.

Another embodiment of the present invention is to control the digital receiver such that the above-mentioned embodiments can be equally applied when an additional service such as social networking service (SNS) is used in addition to a broadcast service.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the present invention provides in one aspect a method of controlling a digital apparatus, and which includes displaying, on a display of the digital apparatus, at least first and second display regions, said first display region configured to display a broadcast program and said second display region displaying social network contents; receiving, via an input unit of the digital apparatus, a selection signal indicating a selection of at least a part of the displayed social network contents; converting, via a controller of the digital apparatus, the selected part of the social network contents into image data; receiving, via the input unit, a moving signal indicating a movement of the converted image data on the display; and executing, via the controller, a predetermined application based on the movement of the image data. The present invention also provides a corresponding digital apparatus.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
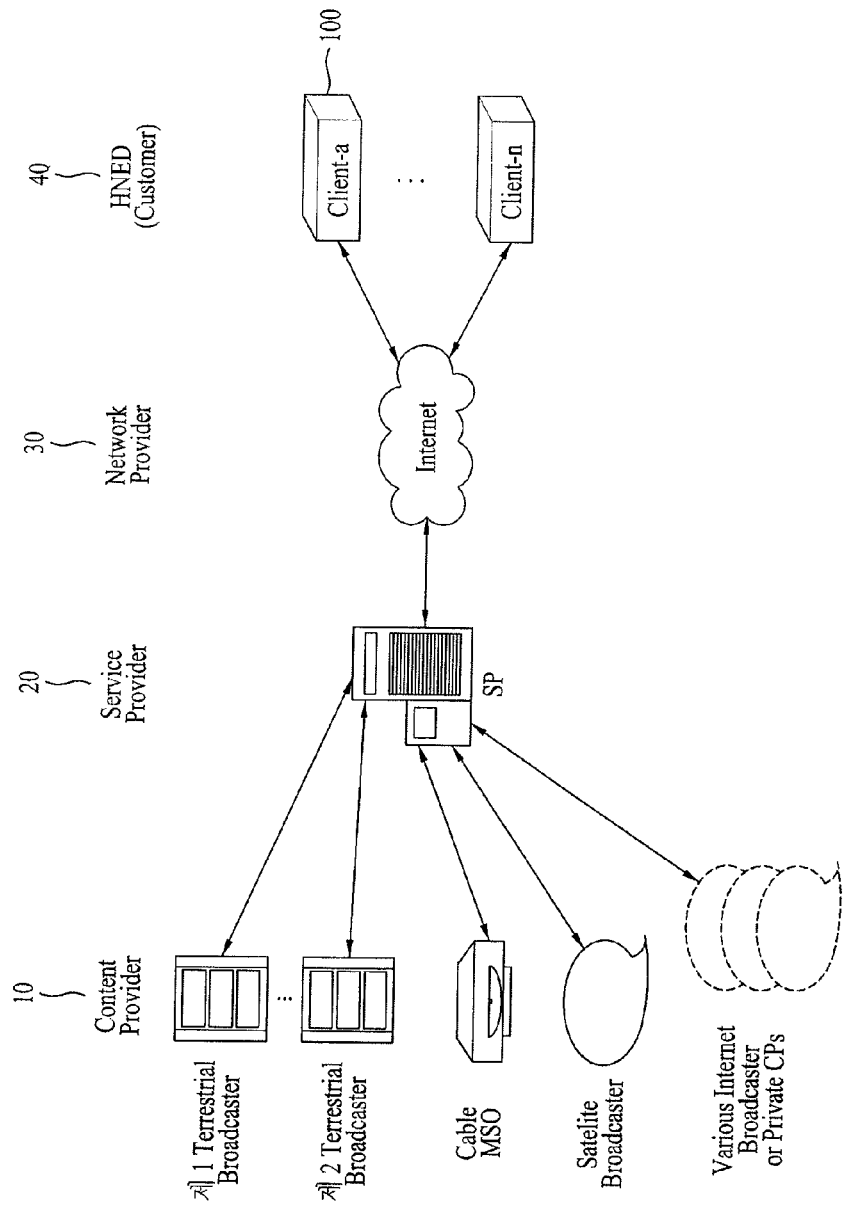
FIG. 1 illustrates an broadcast system including a digital receiver according to an embodiment of the present invention.

Although embodiments of the present invention will be described in detail with reference to the accompanying drawings and content of the drawings, the present invention is not limited or restricted by such embodiments. The terms "module" and "unit or part" used to signify components are used herein to aid in understanding of the components. Accordingly, the terms "module" and "unit or part" may be used interchangeably.

Various embodiments of a digital receiver and a method for controlling the same according to the present invention will now be described with reference to the attached drawings. In particular, the present invention can provide a digital receiver and a method for providing a user interface by which a user can easily and rapidly access and use desired information or data, or a desired function, thereby allowing the user to access and use the digital receiver conveniently. For example, when the user selects some area or region or such data from a screen, a first process for calling an application of a function or information or data relating to the selected area or data is performed, and then a second process is automatically/manually performed according to controlling of the digital receiver/the user, such as an action or request of the user for a result of the first process (a first result). At least one of the first process and the second process can be applied in the same manner when additional services such as an SNS are used in addition to a main service or broadcast service.

Further, the digital receiver is configured such that the user easily control (e.g., move) the first result. The user can move the first result by directly touching the screen of the digital receiver or using an arbitrary mechanism. The digital receiver can also manually/automatically perform the second process for a desired action of the user based on the location or location information of the first result moved by the user. For example, the location or location information of the first result can include coordinate information on the screen of the digital receiver. Because the digital receiver can be acquire or store coordinate information about data which needs to be displayed on the screen in advance in order to provide an output through the screen, the coordinate information can be used. Furthermore, the digital receiver can provide a response to the control of the user for the first result by outputting a result of the second process (a second result) to a different area of the screen, thereby improving user convenience. While the first result is exemplified as image data or an icon in order to easily move the first result on the screen, the first result can include any form controllable by the user.

The type and operation form of the second process can be determined based on the location to which the first result is moved by the user. For example, if the user moves the first result to an area of the screen, through which a broadcast service is provided, the second process can be performed through a broadcast guide based on the first result and the broadcast guide can be provided as the second result. In this instance, the broadcast guide as the second result can be aligned or provided based on information relating to the first result. In addition to the broadcast guide, an interface or interfaces, such as a web browser, Media, Application store, My App, etc., can be provided as the second result. The second result can be provided based on at least one of audio data, video data and text data obtained by searching or detecting the information relating to the first result. The audio data and video data may be executed manually/automatically. The second result is a result obtained by controlling the first result and can include responses in various forms, which can be provided in the digital receiver, as well as the aforementioned information and data.

In the specification, the "first process" is referred to as an operation of imaging a specific object such as a predetermined area or data such that the specific object can be visually recognized for convenient access and/or control of the object. A detailed operation and procedure of the first process will be described in detail below.

Further, the first process, the first result, the second process and the second result, or combinations thereof, described in the specification, are made during a procedure which is started at the request of the user and outputs a response. The procedure can be called an 'activation' because an activation function is executed between the request and the response.

In the following description, the "digital receiver" refers to an intelligent receiver capable of supporting a broadcast service function and/or a computing function and includes electronic devices which are fixed to predetermined spaces and portable electronic devices. The digital receiver can be interfaced with a mechanism such as a handwriting type input device, a touch-screen, or a pointing device in a wired/wireless manner to execute a function at the request or action of the user, or output a result. The digital receiver can support IP (Internet Protocol) through a wired/wireless network. Accordingly, the user can be provided with services such as e-mail, web browsing, banking and gaming services through the digital receiver.

The digital receiver can use a standardized general-purpose operating system (OS) in order to execute functions relating to the above-mentioned various services and provide a user-friendly interface by freely adding and deleting various applications on OS kernel through the standardized general-purpose OS. Examples of the digital receiver can include a network TV receiver, a hybrid broadcast broadband TV receiver, a start TV receiver, and an IPTV receiver. Furthermore, the digital receiver can further include mobile terminals such as a personal digital assistant (PDA), a smart phone, a tablet PC, etc. The digital receiver can receive data from one or more servers connected thereto through a network and output the data received from the servers to separate regions on the screen. A smart TV or social TV capable of providing the broadcast service and an additional service such as an SNS will be described as an example of the digital receiver.

Turning now to FIG. 1, which illustrates a broadcast system including a digital receiver according to an embodiment of the present invention. Examples of a broadcast system including a digital receiver includes a content provider (CP) 10, a service provider (SP) 20, a network provider (NP) 30, and a home network end user (HNED) (Customer) 40. The HNED 40 includes a client 100, that is, a digital receiver.

Each of the CP 10, SP 20 and NP 30, or a combination thereof may be referred to as a server. The FINED 40 can also function as a server. The term 'server' means an entity that transmits data to another entity in a digital broadcast environment. Considering a server-client concept, the server can be regarded as an absolute concept and a relative concept. For example, one entity can be a server in a relationship with a first entity and can be a client in a relationship with a second entity.

The CP 10 is an entity that produces content. Referring to FIG. 1, the CP 10 can include a $1^{st}$ or $2^{nd}$ terrestrial broadcaster, a cable system operator (SO), a multiple system operator (MSO), a satellite broadcaster, various Internet broadcasters, private content providers (CPs), etc. The content can include applications as well as broadcast content.

The SP 20 packetizes content provided by the CP 10. Referring to FIG. 1, the SP 20 packetizes content provided by the CP 10 into one or more services available for users. Further, the SP 20 can provide services to the client 100 in a uni-cast or multi-cast manner. In addition, the CP 10 and the SP 20 can be configured in the form of one entity. For example, the CP 10 can function as the SP 20 by producing content and directly packetizing the produced content into services, and vice versa.

Also, the NP 30 can provide a network environment for data exchange between the server 10 and/or 20 and the client 100. The NP 30 supports wired/wireless communication protocols and constructs environments therefor. In addition, the NP 30 can provide a cloud environment. In addition, the client 100 can construct a home network and transmit/receive data.

The server can use and request a content protection means such as conditional access. In this instance, the client 100 can use a mechanism such as a cable card or downloadable CAS (DCAS), which corresponds to the content protection mechanism of the server. In addition, the client 100 can use an interactive service through a network. In this instance, the client 100 can directly serve as the CP 10 and/or the SP 20 in a relationship with another client or indirectly function as a server of the other client.

Figure 2:
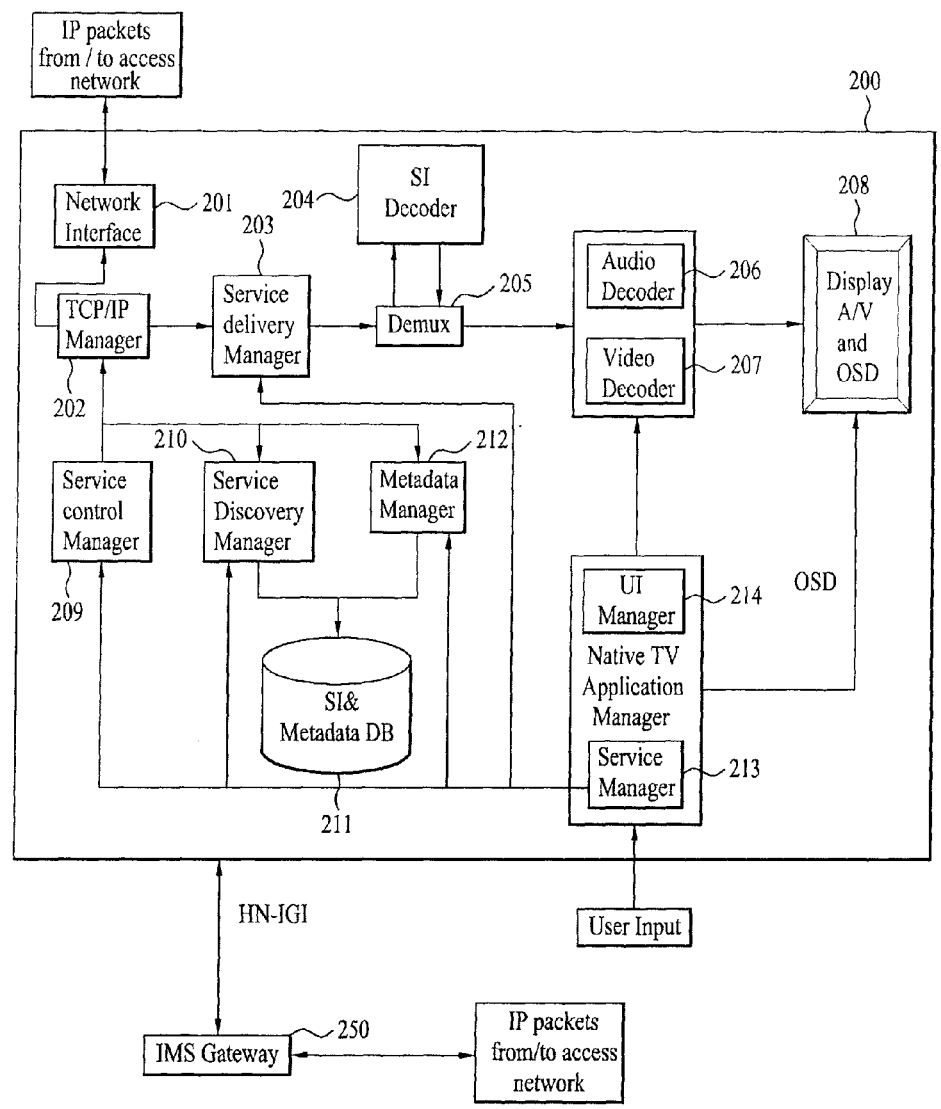
FIG. 2 illustrates a digital receiver according to an embodiment of the present invention.

Next, FIG. 2 is a schematic diagram of a digital receiver 200 according to an embodiment of the present invention. The digital receiver 200 may correspond to the client 100 shown in FIG. 1.

Further, a digital receiver according to an embodiment of the present invention may include a receiving unit configured to receive a signal containing at least one service, a decoder configured to decode the received service, a controller configured to control activated data corresponding to a predetermined area or data to be output by performing a first process when the predetermined area or data is selected from a screen and to control a specific mode to be executed as a second process when the activated data accesses a boundary region of the screen, and a display unit configured to display the decoded service, the activated data under the control of the controller, and a resultant of the executed specific mode on the screen. The specific mode can include a tray including a collection of the activated data to a first region from a spare region generated by controlling the size and resolution of the full screen configured prior to the first process.

The controller can control one or more search engines for the specific mode to be output to a second region from the spare region, control a quick search icon configured with a combination of predetermined data included in the tray and a predetermined search engine selected from the search engines to be output to a third region from the spare region, control a result obtained by searching the corresponding tray data through the corresponding search engine to be displayed on the screen when the quick search icon is accessed, and determine whether the activated data accesses the boundary of the screen based on coordinate information about screen configuration.

In addition, the controller can control at least one of the activated data and tray data to be configured using at least one of text data, audio data, video data, and image data. If at least one of the activated data and tray data correspond to image data, the controller can control the image data to be configured in at least one of BMP, JPG, JPEG, and PNG formats.

A digital receiver according to another embodiment of the present invention may include a receiving unit configured to receive a signal containing at least one service, a decoder configured to decode the received service, a controller configured to control a first process to be performed to configure and output activated data corresponding a first region when the first region is selected from a screen providing at least one service and to control a specific function to be executed based on coordinate information of a second region as a second process when the output activated data is located in the second region, and a display unit configured to display the decoded service and a result of the second process under the control of the controller on a third region of a screen.

The controller can recognize at least one of text data, image data and object data as the first region according to corresponding service and recognize at least one of a web browser, App store, My App, Media, and tray function as the specific function. The controller can also control the activated data image to be included in a header of actual text string information.

A smart TV is exemplified as the digital receiver 200 in the following description in order to help understanding of the present invention and improve convenience of description. Here, the smart TV can provide an additional service such as SNS.

Further, the digital receiver 200 in FIG. 2 includes a network interface 201, a TCP/IP manager 202, a service delivery manager 203, an SI (System Information, Service Information or Signaling Information) decoder 204, a demultiplexer 205, an audio decoder 206, a video decoder 207, a display A/V and OSD (On Screen Display) module 208, a service control manager 209, a service discovery manager 210, a SI & metadata database (DB) 211, a metadata manager 212, an application manager, etc.

The network interface 201 can receive or transmit IP packets including service data through a network. In other words, the network interface 201 can receive IP packets including at least one of text data, image data, audio data, and video data, used for SNS, as well as services and applications from a server connected thereto through a network.

Further, the TCP/IP manager 202 may involve delivery of IP packets transmitted to the digital receiver 200 and IP packets transmitted from the digital receiver 200, that is, packet delivery between a source and a destination. The TCP/IP manager 202 can classify received packets according to an appropriate protocol and output the classified packets to the service delivery manager 205, the service discovery manager 210, the service control manager 209, and the metadata manager 212.

In addition, the service delivery manager 203 can control classification and processing of service data. The service delivery manager 203 can also control real-time streaming data, for example, using real-time protocol/real-time control protocol (RTP/RTCP). In other words, the service delivery manager 203 can parse a real-time streaming data packet, transmitted based on the RTP, according to the RTP and transmits the parsed data packet to the demultiplexer 205 or store the parsed data packet in the SI & metadata DB 211 under the control of the service manager 213. The service delivery manager 203 can feed back network reception information to the server based on the RTP.

The demultiplexer 205 can demultiplex audio data, video data, SI from a received packet through packet identifier (PID) filtering and transmit the demultiplexed data to corresponding processors, that is, the audio/video decoder 206/207 and the SI decoder 204. The SI decoder 204 can parse and/or decode SI data such as program specific information (PSI), program and system information protocol (PSIP), digital video broadcast-service information (DVB-SI), etc.

In addition, the SI decoder 204 can store the parsed and/or decoded SI data in the SI & metadata DB 211. The SI data stored in the SI & metadata DB 211 can be read or extracted and used by a component which requires the SI data. EPG data can also be read from the SI & metadata DB 211. This will be described below in detail.

The audio decoder 206 and the video decoder 207 respectively can decode audio data and video data, which are demultiplexed by the demultiplexer 205. The decoded audio data and video data may be provided to the user through the display unit 208. The application manager may include a service manager 213 and a user interface (UI) manager 214, administrate the overall state of the digital receiver 200, provides a UI, and manage other mangers.

Further, the UI manager 214 can receive a key input from the user and provide a graphical user interface (GUI) related to a receiver operation corresponding to the key input through OSD. The service manager 213 can also control and manage service-related managers such as the service delivery manager 203, the service discovery manager 210, the service control manager 209, and the metadata manager 212.

In addition, the service manager 213 can configure a channel map and enable channel control at the request of the user based on the channel map. The service manager 213 can also receive service information corresponding to channel from the SI decoder 204 and set audio/video PID of a selected channel to the demultiplexer 205 so as to control the demultiplexing procedure of the demultiplexer 205.

Further, the application manager can configure an OSD image or control configuration of the OSD image to provide a window for SNS on a predetermined region of the screen when the user requests SNS. The application manager can configure the OSD image or control the configuration of OSD image such that the SNS window can be determined and provided at the request of the user in consideration of other services, for example, a broadcast service. In other words, when the digital receiver 200 provides a service (for example, SNS) through an image on the screen, the digital receiver 200 can configure the image such that it can appropriately cope with requests in consideration of relationship with other services, priority, etc.

The application manager can receive data for SNS from a related external server such as an SNS providing server or a manufacturer-provided server and store the received data in a memory such that the data is used to configure OSD for providing SNS at the request of the user and SNS may be provided through a predetermined area of the screen. Furthermore, the digital receiver 200 can store data, related with a service and input by the user during the service, in the memory in a similar manner such that the data is used to configure the service and, if required, process the data into a form required for another digital receiver and transmit the processed data to the other digital receiver or a related service server.

In addition, the application manager, the controller or the digital receiver can control information or an action corresponding to a request of the user to be executed when the user makes the request while using the SNS. For example, when the user selects input data of another user or a region corresponding to the input data while using the SNS, the application manager, the controller or the digital receiver can control the first process and/or the second process for handling the selected data or region to be performed and control the first result and/or the second result to be output in an appropriate form. The first result and/or the second result can include information, an action, a related UI, etc. and be configured in various forms such as text, an image, audio/video data, etc. The first result and/or the second result can be manually or automatically provided and performed by the digital receiver.

When the user moves the first result (e.g. image data) to a broadcast program or broadcast service output area through drag & drop, the digital receiver can perform the second process (e.g., search process) on data relating to the first result using an electronic program guide (EPG) or electronic service guide (ESG) (referred to as 'broadcast guide' hereinafter) (i.e., a search engine) to provide a second result. Here, the second result can be provided in a form similar to the broadcast guide used as a search engine or provided as a separately configured UI. When the second result is provided in the form of the broadcast guide, other data can be provided with the second result. In this instance, the second result can be configured such that it is distinguished from other data so as to allow the user to easily recognize the second data. To discriminate the second result from other data, the second result can be highlighted, hatched, and provided in 3-dimensional (3D) form.

In the execution of the second process, the digital receiver can automatically determine the type of the second process and whether or not to perform the second process based on a position variation of the first result. In this instance, coordinate information of the screen can be used for determining whether the position of the first result is changed or for information on a changed position between the second process and the first result. For example, when a service and/or OSD are displayed on the screen, the digital receiver can determine and store coordinate information about the displayed service and/or OSD. Accordingly, the digital receiver can be aware of coordinate information about a service and data being provided to the screen in advance and thus can recognize a variation in the position (information) of the first result based on the coordinate information and perform the second process based on the position of the first result.

Further, the service discovery manager 210 can provide information required to select a service provider that provides a service. Upon receipt of a signal for selecting a channel from the service manager 213, the service discovery manager 210 discovers a service based on the received signal. The service control manager 209 can also select and control a service. For example, the service control manager 209 may perform service selection and control using IGMP (Internet Group Management Protocol) or real time streaming protocol (RTSP) when the user selects a live broadcast service and using RTSP when the user selects a video on demand (VOD) service.

The schemes or protocols described in the specification are exemplified in order to aid in understanding of the present invention for convenience of explanations and the scope of the present invention is not limited thereto. Accordingly, the schemes or protocols can be determined in consideration of conditions different from the exemplified ones and other schemes or protocols can be used.

Also, the metadata manager 212 can manage metadata regarding services and store metadata in the SI & metadata DB 211. The SI & metadata DB 211 can store SI data decoded by the SI decoder 204, metadata managed by the metadata manager 212, and information required to select a service provider, which is provided by the service discovery manager 210. In addition, the SI & metadata DB 211 can store system set-up data. An IMS (IP Multimedia Subsystem) gateway 250 can include functions required to access an IMS based IPTV services.

Figure 3:
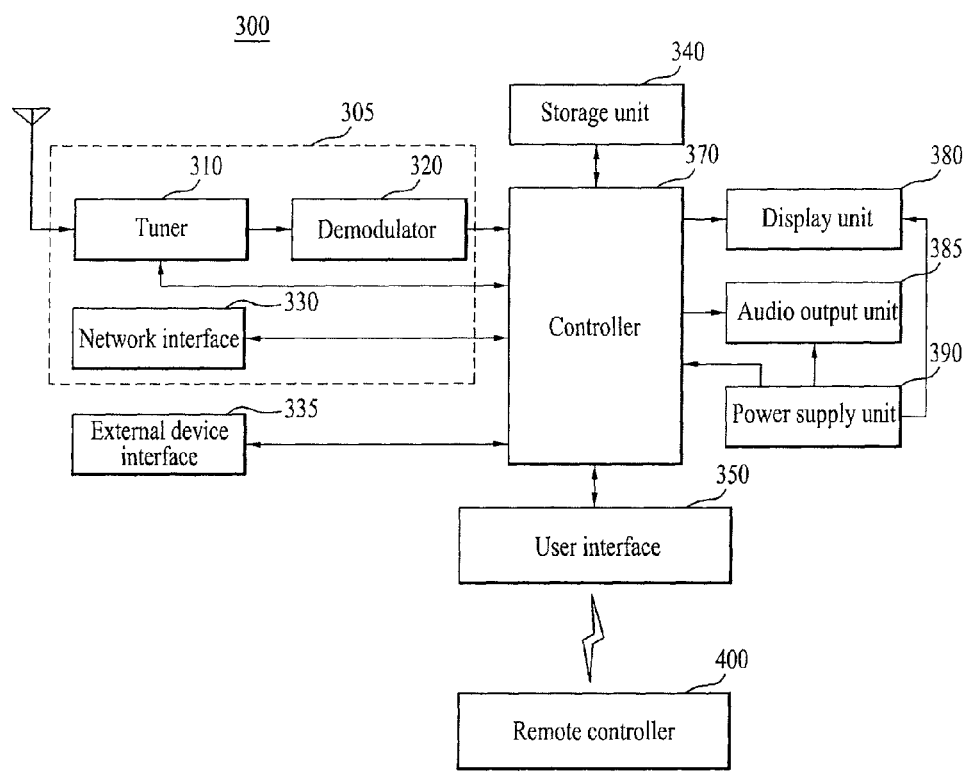
FIG. 3 illustrates a digital receiver according to another embodiment of the present invention.

Next, FIG. 3 illustrates a digital receiver 300 according to another embodiment of the present invention. Referring to FIG. 3, the digital receiver 300 includes a broadcast receiving unit 305, an external device interface 335, a storage unit 340, a user input interface 350, a controller 370, a display unit 380, an audio output unit 385, a power supply unit 390, and a photographing unit. The broadcast receiving unit 305 includes at least one of one or more tuner 310, a demodulator 320, and a network interface 330. The broadcast receiving unit 305 includes the tuner 310 and the demodulator 320 without the network interface 330, or include the network interface 330 without the tuner 310 and the demodulator 320. The broadcast receiving unit 305 includes a multiplexer to multiplex a signal, which is subjected to the tuner 310 and demodulated by the demodulator 320, and a signal received through the network interface 330. In addition, the broadcast receiving unit 305 can include a demultiplexer and demultiplex a multiplexed signal, a demodulated signal, or a signal received through the network interface 330.

The tuner 310 can receive a radio frequency (RF) broadcast signal by tuning to a channel selected by the user from among RF broadcast signals received through an antenna or all previously stored channels. Further, the demodulator 320 can receive a digital IF (Intermediate Frequency) signal (DIF) converted by the tuner 310 and demodulate the DIF signal.

A stream signal output from the demodulator 320 can be input to the controller 370, and the controller 370 can control demultiplexing, audio/video signal processing, etc. Furthermore, the controller 370 can control output of an image through the display unit 380 and output of audio through the audio output unit 385.

Further, the external device interface 335 can provide an environment for interfacing external devices with the digital receiver 300. To implement this, the external device interface 335 can include an A/V input/output unit or an RF communication unit. In addition, the external device interface 335 can be connected with external devices such as a digital versatile disk (DVD), a Blu-ray player, a game device, a camera, a camcorder, a computer (notebook computer), a Cloud and a mobile device (e.g., a Smart Phone, a tablet PC, and the like) in a wired/wireless manner.

The A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

Further, the RF communication unit can perform near field communication. The digital receiver 300 can be networked with other electronic apparatuses according to communication protocols such as Bluetooth, radio frequency identification (RFID), infrared data association (IrDA), ultra wideband (UWB), ZigBee, and digital living network alliance (DLNA), for example.

The network interface 330 can provide an interface for connecting the digital receiver 300 to wired/wireless networks. Using the network interface 330, the digital receiver can transmit/receive data to/from other users or other electronic apparatuses or access a predetermined web page through a network connected thereto or another network linked to the connected network. Also, the network interface 330 can selectively receive a desired application from among publicly open applications through a network.

In addition, the storage unit 340 can store programs for signal processing and control and store a processed video, audio or data signal. The storage unit 340 can also execute a function of temporarily storing a video, audio or data signal input from the external device interface 335 or the network interface 330. The storage unit 340 can store information about a predetermined broadcast channel through a channel memory function.

The storage unit 340 can store an application or a list of applications input from the external device interface 335 or the network interface 330. The storage unit 340 can store various platforms which will be described later. The storage unit 340 can include storage media of one or more types, such as a flash memory type, a hard disk type, a multimedia card micro type, a card type memory (e.g. SD or XD memory), RAM, EEPROM, etc. The digital receiver 300 can reproduce content files (a video file, a still image file, a music file, a text file, an application file, etc.) and provide them to the user.

While FIG. 3 illustrates an embodiment in which the storage unit 340 is separated from the controller 370, the configuration of the digital receiver 300 is not limited thereto and the storage unit 340 can be included in the controller 370.

The user input interface 350 can transmit a signal input by the user to the controller 370 or deliver a signal output from the controller 370 to the user. For example, the user input interface 350 can receive control signals such as a power on/off signal, a channel selection signal, an image setting signal, etc. from the remote controller 400 or transmit control signals of the controller 370 to the remote controller 400 according to various communication schemes such as RF communication, IR communication, and the like.

The user input interface 350 can transmit control signals input through a power key, a channel key, a volume key, and a local key of a set value to the controller 370. The user input interface 350 can transmit a control signal input from a sensing unit which senses a gesture of the user or deliver a signal of the controller 370 to the sensing unit. Here, the sensing unit may include a touch sensor, a voice sensor, a position sensor, an action sensor, an acceleration sensor, a gyro sensor, a speed sensor, a tilt sensor, a temperature sensor, a pressure or back-pressure sensor, etc.

The controller 370 can generate and output a signal for video or audio output by demultiplexing streams input through the tuner 310, the demodulator 320 or the external device interface 335 or processing demultiplexed signals.

A video signal processed by the controller 370 can be input to the display unit 380 and displayed as an image through the display unit 380. In addition, the video signal processed by the controller 370 can be input to an external output device through the external device interface 335. Further, an audio signal processed by the controller 370 can be applied to the audio output unit 385. Otherwise, the audio signal processed by the controller 370 can be applied to an external output device through the external device interface 335.

The controller 370 may include a demultiplexer and an image processor, which are not shown in FIG. 3. The controller 370 can control the overall operation of the digital receiver 300. For example, the controller 370 can control the tuner 310 to tune to an RF broadcast corresponding to a channel selected by the user or a previously stored channel.

The controller 370 can control the digital receiver 300 according to a user command input through the user input interface 350 or an internal program. Particularly, the controller 370 can control the digital receiver 300 to be linked to a network to download an application or application list that the user desires to the digital receiver 300.

For example, the controller 370 can control the tuner 310 to receive a signal of a channel selected in response to a predetermined channel selection command received through the user input interface 350. In addition, the controller 370 can process a video, audio or data signal corresponding to the selected channel. The controller 370 can control information on a channel selected by the user to be output with a processed video or audio signal through the display unit 380 or the audio output unit 385.

Alternatively, the controller 370 can control a video signal or an audio signal received from an external apparatus, for example, a camera or a camcorder through the external device interface 335 to be output through the display unit 380 or the audio output unit 385 according to an external device image reproduction command received through the user input interface 350.

The controller 370 can control the display unit 380 to display images. For example, the controller 370 can control a broadcast image input through the tuner 310, an external input image received through the external device interface 335, an image input through the network interface 330, or an image stored in the storage unit 340 to be displayed on the display unit 380. Here, an image displayed on the display unit 380 can be a still image or video, and it can be a 2D or 3D image.

The controller 370 can also control reproduction of content. Here, the content may be content stored in the digital receiver 300, received broadcast content, or content input from an external device. The content may include at least one of a broadcast image, an external input image, an audio file, a still image, an image of a linked web, and a text file.

The controller 370 can control display of applications or an application list, downloadable from the digital receiver 300 or an external network, when an application view menu is selected. Further, the controller 370 can control installation and execution of applications downloaded from an external network in addition to various user interfaces. Furthermore, the controller 370 can control an image relating to an application executed by user selection to be displayed on the display unit 380.

The digital receiver 300 may further include a channel browsing processor which generates a thumbnail image corresponding to a channel signal or an external input signal. The channel browsing processor can receive a stream signal (TS) output from the demodulator 320 or a stream signal output from the external device interface 335 and extract an image from the received stream signal to generate a thumbnail image. The generated thumbnail image can be directly input to the controller 170 or can be encoded and then input to the controller 170. Also, the thumbnail image can be coded into a stream and then applied to the controller 370. The controller 370 can display a thumbnail list including a plurality of thumbnail images on the display unit 380 using thumbnail images input thereto. The thumbnail images included in the thumbnail list can be updated sequentially or simultaneously. Accordingly, the user can conveniently check content of a plurality of broadcast channels.

The display unit 380 can convert a video signal, a data signal, and an OSD signal processed by the controller 370 and a video signal and a data signal received from the external device interface 335 into RGB signals to generate driving signals. The display unit 380 may be a PDP, an LCD, an OLED, a flexible display, a 3D display or the like. The display unit 380 may be configured as a touch-screen and used as an input device rather than an output device. The audio output unit 385 receives a signal audio-processed by the controller 170, for example, a stereo signal, a 3.1 channel signal or a 5.1 channel signal, and outputs the received signal as audio. The audio output unit 385 can be configured as one of various speakers.

The digital receiver 300 may further include the sensing unit for sensing a gesture of the user, which includes at least one of a touch sensor, a voice sensor, a position sensor, and an action sensor, as described above. A signal sensed by the sensing unit can be delivered to the controller 370 through the user input interface 350. The digital receiver 300 may further include the photographing unit for photographing the user. Image information acquired by the photographing unit can be supplied to the controller 370. The controller 370 can sense a gesture of the user from an image captured by the photographing unit or a signal sensed by the sensing unit, or by combining the image and the signal.

The power supply unit 390 can supply power to the digital receiver 300. Particularly, the power supply unit 390 can supply power to the controller 370 which can be implemented as a system-on-chip (SOC), the display unit 380 for displaying images, and the audio output unit 385 for audio output.

Further, the remote controller 400 can transmit user input to the user input interface 350. To achieve this, the remote controller 400 can use Bluetooth, RF communication, IR communication, UWB, ZigBee, etc. In addition, the remote controller 400 can receive audio, video or data signal output from the user input interface 350 and display the received signal or output the same as audio or vibration.

The functions of the application manager shown in FIG. 2 can be divided and executed by the controller 370, the storage unit 340, the user interface 350, the display unit 380 and the audio output unit 385 which are controlled by the controller 370.

The digital receivers shown in FIGS. 2 and 3 are exemplary and components thereof can be integrated, added or omitted according to specifications thereof. That is, two or more components can be integrated into one component or one component can be subdivided into two or more components as required. The function executed by each component is exemplified to describe embodiments of the present invention and detailed operations or devices do not limit the scope of the present invention. Some of the components shown in FIG. 2 may be omitted or a component (not shown in FIG. 2) may be added as required. The digital receiver according to the present invention may not include the tuner and the demodulator, differently from the digital receivers shown in FIGS. 2 and 3, and may receive content through the network interface or the external device interface and reproduce the content.

The digital receiver is an example of image signal processors which process an image stored therein or an input image. Other examples of the image signal processors may include a set-top box (STB) which does not include the display unit 380 and the audio output unit 385 shown in FIG. 3, a DVD player, a Blu-ray player, a game device, a computer, etc.

Figure 4:
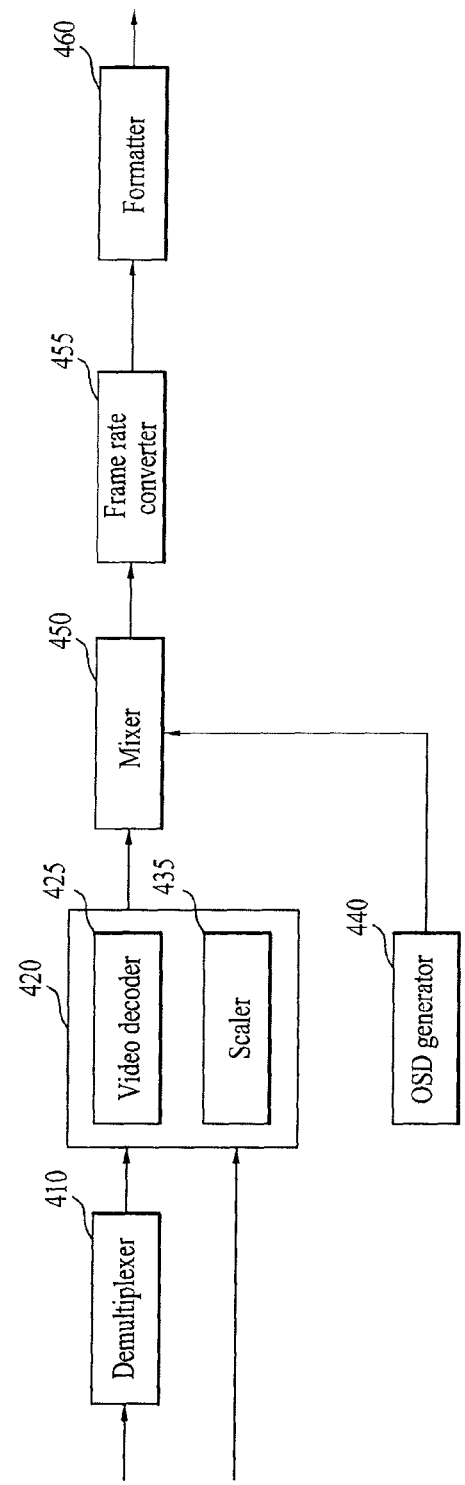
FIG. 4 illustrates a digital receiver according to another embodiment of the present invention.

Next, FIG. 4 illustrates a digital receiver according to another embodiment of the present invention. Particularly, FIG. 4 shows a configuration for implementing a 3D digital receiver, which can be included in the configurations of FIGS. 2 and 3.

The digital receiver according to the present invention includes a demultiplexer 410, an image processor 420, an OSD generator 440, a mixer 450, a frame rate converter (FRC) 455, and a 3D formatter (or an Output formatter) 460.

The demultiplexer 410 can demultiplex an input stream signal into an MPEG-2 TS image, an audio signal and a data signal, for example. In addition, the image processor can process a demultiplexed image signal using a video decoder 425 and a scaler 435. The video decoder 425 can decode the demultiplexed image signal and the scaler 435 can scale the resolution of the decoded image signal such that the image signal can be displayed.

The image signal decoded by the image processor 420 can be input to the mixer 450. The OSD generator 440 can generate OSD data automatically or according to user input. For example, the OSD generator 440 can generate data to be displayed on the screen of an output unit in the form of an image or text based on a control signal of a user input interface. OSD data generated by the OSD generator 440 may include various data such as a user interface image of the digital receiver, various menu screens, widget, icons, and information on ratings. The OSD generator 440 can generate a caption of a broadcast image or data for displaying EPG based broadcast information.

The mixer 450 can mix the OSD data generated by the OSD generator 440 and the image signal processed by the image processor 420. The mixer 450 can provide the mixed signal to the 3D formatter 460. By mixing the decoded image signal and the OSD data, OSD may be overlaid on a broadcast image or external input image.

The frame rate converter (FRC) 455 can convert a frame rate of input video. For example, the frame rate converter 455 can convert the frame rate of an input 60 Hz video to a frame rate of 120 Hz or 240 Hz, according to an output frequency of the output unit. The frame rate converter 455 may be bypassed when frame conversion is not executed.

The 3D formatter 460 can change the output of the frame rate converter 455, which is input thereto, into a form suitable for the output format of the output unit. For example, the 3D formatter 460 can output an RGB data signal. In this instance, this RGB data signal can be output according to low voltage differential signaling (LVDS) or mini-LVDS. When a 3D image signal output from the frame rate converter 455 is input to the 3D formatter 460, the 3D formatter 460 can format the 3D image signal such that the 3D image signal is matched to the output format of the output unit, to thereby support a 3D service.

An audio processor can audio-process a demultiplexed audio signal. The audio processor can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor can include decoders corresponding to the formats to process the audio signals. Furthermore, the audio processor can control base, treble and volume.

In addition, a data processor can process a demultiplexed data signal. For example, when a demultiplexed data signal is encoded, the data processor can decode the encoded demultiplexed data signal. Here, the encoded data signal may be EPG information including broadcast information such as the start time and end time (or duration) of a broadcast program which is broadcast through each channel.

Figure 5:
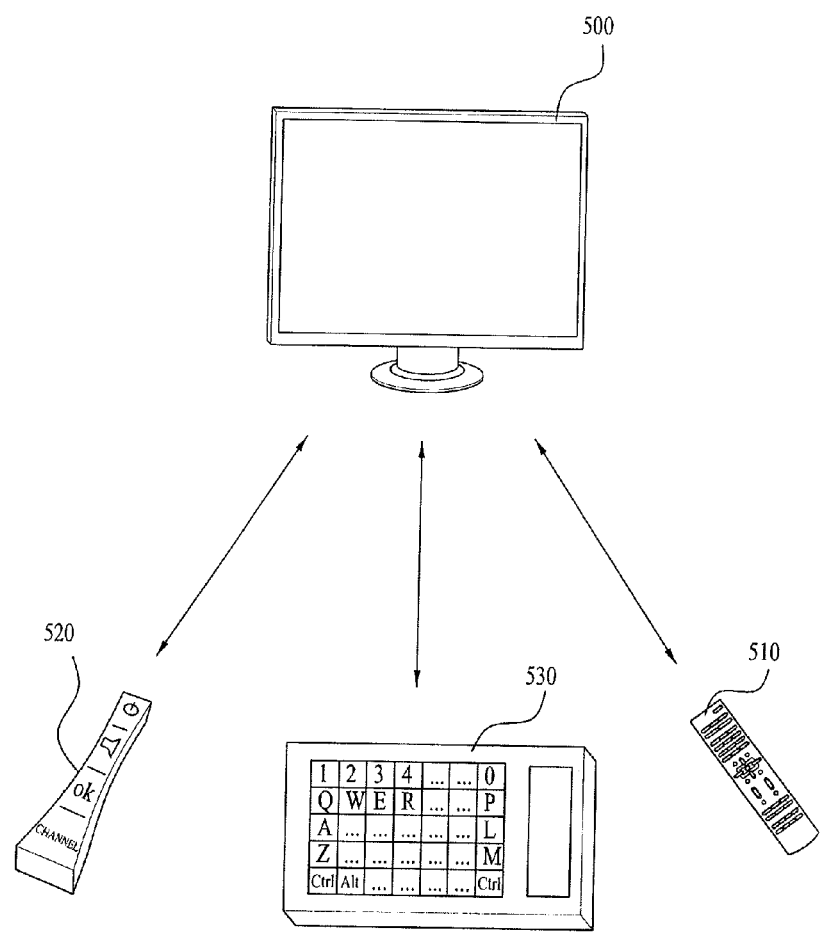
FIG. 5 illustrates remote control devices of a digital receiver according to an embodiment of the present invention.

FIG. 5 illustrates remote controllers of a digital receiver according to an embodiment of the present invention. To execute various operations for implementing the present invention according to embodiments, various user interface devices (UIDs) which can communicate with a digital receiver 500 in a wired/wireless manner can be used as remote controllers.

The remote controllers can use various communication protocols such as Bluetooth, RFID, IrDA, UWB, ZigBee, DLNA, etc. UIDs can include a mobile device (e.g., a smart phone, a tablet PC, and the like), a magic remote controller 520 and a remote controller 530 equipped with a keyboard and a touch pad in addition to a general remote controller 510.

The magic remote controller 520 may include a gyro sensor mounted therein to sense vibration of a user's hand or rotation. That is, the magic remote controller 520 can move a pointer according to up, down, left and right motions of the user such that the user can easily execute a desired action, for example, easily control a channel or a menu.

The remote controller 530 including the keyboard and touch pad can facilitate text input through the keyboard and control of movement of a pointer and magnification and reduction of a picture or video through the touch pad.

Various embodiments of the digital receiver and method for controlling the same according to the present invention will be described with reference to the attached drawings. However, the scope of the present invention is not limited to the embodiments described below.

The method for controlling a digital receiver according to the present invention may be based on the following principle. When some area or such data is selected from a screen, a first process is performed on the selected area or data so as to generate image data such as an icon, that is, a first result such that the user can activate the first result. When the first result activated by the user is moved to a predetermined area or position, a second process may be performed based on the area or position of the moved first result to output desired information or a desired function, that is, a second result. The digital receiver may determine the corresponding function, that is, the second process based on coordinate information about the position of the moved first result and control a corresponding function (second result) to be automatically executed according to the second process. To achieve this, the digital receiver can previously store coordinate information about respective areas or positions of the screen in a storage unit.

The digital receiver can provide the first result to a predetermined region on the screen. For example, the digital receiver can output the first result to a region adjacent to the selected area or selected data. Otherwise, the digital receiver can output the first result to an area which does not disturb a currently provided service.

The second result can be provided in the form of EPG if the first result may be moved to a broadcast service output area and thus the second process uses EPG. If the second process uses a web browser, the second result can be provided in the form of a web browser. In addition, the first result and/or the second result can be provided in the form of OSD data or a UI, which is separately configured.

Furthermore, the digital receiver can execute a specific mode as the second process when the first result is located in a specific region (drag is maintained or drag is released, that is, drop). As a result of the execution of the specific mode, the digital receiver can provide a tray relating to the first result to a predetermined area of the screen as the second result.

Each result can include data in various forms. And, one of text data, image data, audio data and video data, or a combination thereof can be provided as the data. In addition, hyper text markup language (HTML), extensible markup language (XML) or the like can be provided as the data format of each result based on automatic execution function or features of services.

As described above, the digital receiver can allow the user to intuitively and visually recognize and execute desired information, a desired function and a desired action in an easier and more convenient manner without going through multiple steps so that the user can easily access and use the digital receiver, thereby increasing user convenience.

The fundamental principle of the present invention will be described in more detail below. To aid in understanding of the present invention and facilitate description of the invention, the first process, the second process and results related to the first and second processes will be sequentially described.

Figure 6:
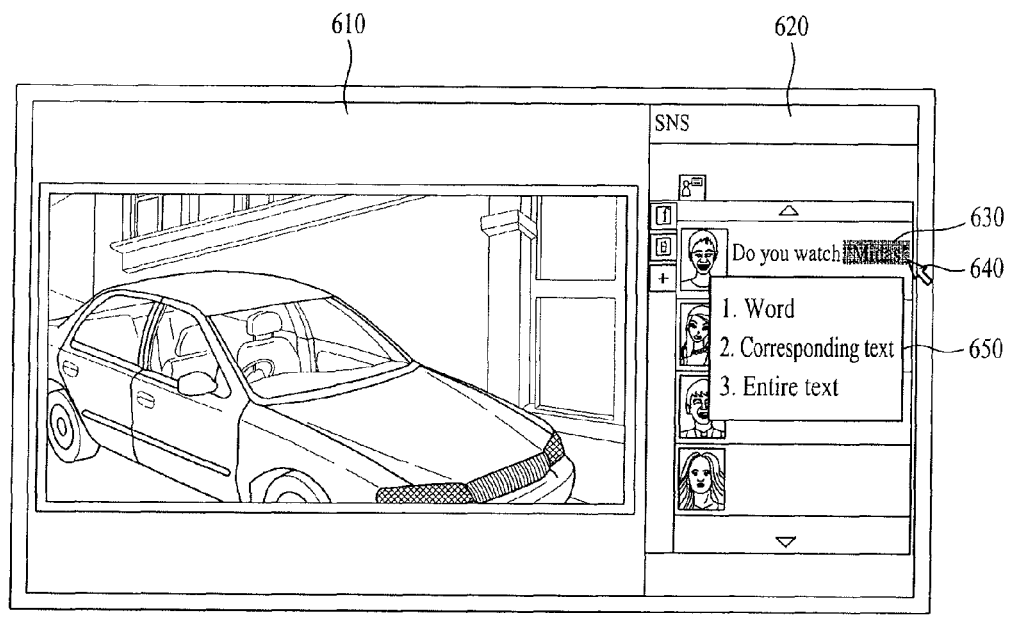
FIG. 6 illustrates an example of selecting predetermined text data from a screen according to an embodiment of the present invention.

FIG. 6 illustrates a method of selecting predetermined text data from a screen according to an embodiment of the present invention. In particular, FIG. 6 illustrates a process of selecting a predetermined region or predetermined data from a screen prior to the first process.

In the example of FIG. 6, a 3D pointing device is used as a mechanism for selecting the predetermined region or data from the screen. However, the mechanism is not limited thereto and can include the above-mentioned various input mechanism and selection mechanism shown in FIG. 5 or other input and selection mechanisms.

The digital receiver can provide the broadcast service and/or one or more additional services on the screen in an independent or combined manner. The additional services can include various services such as SNS, a web browser service, etc. However, SNS is described as an example in this embodiment. The digital receiver can configure and provide a screen as shown in FIG. 6 when the user requests SNS while viewing a broadcast program.

It is assumed that the user finds out that an interesting broadcast program is provided in a channel that the user does not currently watch through the SNS and desires to change the currently watched channel. The user can watch the corresponding broadcast program by directly inputting the channel number of the corresponding channel which provides the broadcast program using an input mechanism, directly searching the channel, or using EPG service.

This channel switching route or scheme has a high possibility of generation of an erroneous operation when the user directly inputs the corresponding channel number and uses a channel up/down button. Furthermore, when the user calls the EPG service and searches information, a complicated procedure should be performed or a long time is required to obtain desired data. That is, the aforementioned method is inconvenient for the user.

Accordingly, the present invention provides a method by which the user can obtain desired data, that is, switch channels more easily and conveniently.

Referring to FIG. 6, the digital receiver can divide the screen into one area 610 and another area 620 and respectively provides the broadcast service and SNS through the two areas 610 and 620 of the screen, simultaneously. The digital receiver can provide the screen as shown in FIG. 6 according to the following procedure or method.

The digital receiver can receive content of a conversation with another user connected through a network from a server of the SNS, process the conversation content into an appropriate form and provide the processed conversion content to the area 620 allocated to the SNS.

Referring to FIG. 6, the digital receiver can control the size and resolution of a screen for providing the broadcast service and provide the screen to the left area 610 which is not overlapped with the area 620 for the SNS. The digital receiver can configure OSD for the SNS and provide the OSD to the area 620.

To provide the SNS at the request of the user, the digital receiver can receive data relating to the SNS from an external server (corresponding service server or a server provided by the digital receiver manufacturer), decode and/or store the received data, and use the data for configuration of OSD for image display. For example, the digital receiver can provide text of the other user, as shown in FIG. 6, by drawing on the surface of the OSD using the decoded data.

The user can select a desired word or text (e.g. two or more words) using a selection mechanism 640. Referring to FIG. 6, the user can select the word "Midas" 630 from the text "I'm watching Midas now. Do you watch?".

A description will be given of a method of selecting a word or text using a pointing device. The user can select a word by placing the pointing device on a syllable of the word and by long clicking the pointing device or clicking it and dragging the first to last syllables of the word.

The user can select text using the pointing device. For example, the user can select text by double-clicking (down→up→down) the pointing device on the start point of the text, dragging the text, and then moving the pointing device up. Otherwise, the user can select the text by clicking (down) the pointing device on the start point of the text, dragging the text, and then moving the pointing device up. Furthermore, the user can select the text by double-clicking (down→up→down) the pointing device on the start point of the text and double-clicking (down→up→down) the pointing device on the end point of the text. Otherwise, the user can select the text by clicking (down→up) the pointing device on the start point of the text and clicking (down→up) the pointing device on the end point of the text.

In addition, when the selection mechanism is a spatial remote controller, it is possible to select a word or text by double-clicking a button of the spatial remote controller, or one-clicking the button, dragging and then moving the spatial remote controller up.

Alternatively, when the user places the selection mechanism at a specific position for a predetermined time, the digital receiver can configure and provide a UI 650, as shown in FIG. 6, such that the user can select a word or text. Referring to the UI 650 shown in FIG. 6, the user can select at least one of a word, corresponding text, and the entire text.

It is noted that the method for selecting a specific word or text while using the SNS is exemplary, and the present invention is not limited thereto and can employ various methods according to selection mechanism.

Figure 7:
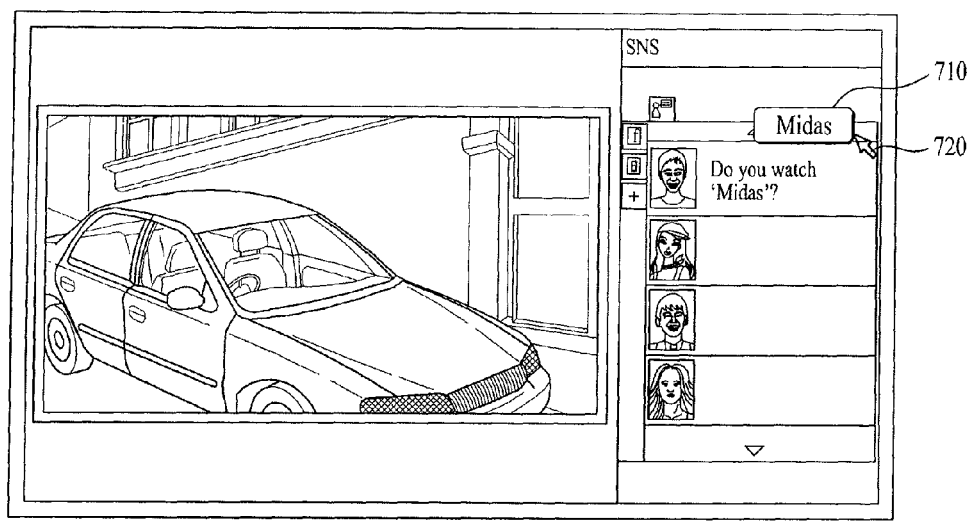
FIG. 7 illustrates an example of generating and activating image data regarding selected data according to an embodiment of the present invention.

FIG. 7 illustrates the first process with respect to selected data and an example of the first result according to an embodiment of the present invention. When predetermined data ('Midas') 630 is selected in the embodiment shown in FIG. 6, the digital receiver can generate image data 710 about the selected data and perform the first process for activating the image data. FIG. 7 illustrates the first process based on a choice of the user.

In the specification, 'activation' can mean an operation of making the result of the first process, that is, the first result being in a controllable state. The controllable state can exemplify a movable state such as drag and drag & drop. The first process and the first result are described in more detail. The selection mechanism 720 can be used to drag and drop the image data 710.

The digital receiver can provide data, which is transmitted from the server, in the form of text, as shown in FIG. 6, by drawing the data on OSD to provide the SNS. In other words, when a predetermined text data region is selected in the example shown in FIG. 6, the digital receiver can previously store actual text data (string) corresponding to the selected text data region.

When the user selects a predetermined data region, the digital receiver can extract actual text data corresponding to the selected data region from the storage unit. The digital receiver can generate the first result in a format which can be activated, for example, in the form of image data such as an icon based on the extracted actual text data. The extracted actual text data and the generated image data (first result) can be linked such that they are used for the second process which will be described later.

In other words, the digital receiver can read text data (i.e., actual text string transmitted from the server) of the selected region, and then draw the text data on the surface of a memory before drawing it on OSD and images the surface. The image data can be configured in various formats such as BMP, JPG, JPEG, PNG, and the like.

While the image data displayed on the screen has a rectangular shape in FIG. 7, the shape or form of the image data is not limited thereto and the image data can have various forms including a circle, a cone, a polygon, and a trapezoid which can be easily recognized by the user. The digital receiver can configure the image data in various sizes or colors or provide the image data in a flickering manner or in a 3D form in order to improve user recognition in the relationship between the image data and the service being provided.

Furthermore, the image data can be configured such that it includes the content of the text of the selected region in order to easily recognize correlation between the image data and the text of the selected region. For example, the user selects text data 'Midas' 630 in the example shown in FIG. 6, and image data in a rectangular shape can be generated and 'Midas' 710 can be displayed in the generated image data in the example shown in FIG. 7. The present invention is not limited to these examples and text data can not be present. Even if the text data is present, abbreviated text or an image representing a word or text can be included in the image data.

Other generated images can be provided to a region around the text data such that the user can recognize the images more easily. However, the present invention is not limited thereto and the images may be provided to other positions when the images displayed around the text data disturb the user who uses the corresponding service. In view of this, the other images can be provided in the form of a tray, which will be described in detail later.

The selected data may be imaged in such a manner that a predetermined region including a text is cut off on OSD provided for an additional service and imaged. Since the digital receiver has information on the OSD image being provided, the digital receiver can recognize information about the selected region, extract data about the recognized region, and automatically perform a function or action according to movement of the image corresponding to the data, which will be described in detail later. Imaging of the selected region is performed based on the aforementioned principle. Similarly, the selected region may be copied and imaged based on OSD data being provided.

FIGS. 8 to 12 illustrate examples of the second process and the second result according to the present invention. In particular, FIGS. 8 to 12 illustrate the second process and the second result which are performed and obtained when the user issues a request for the first process and the first result described with reference to FIGS. 6 and 7.

Figure 8:
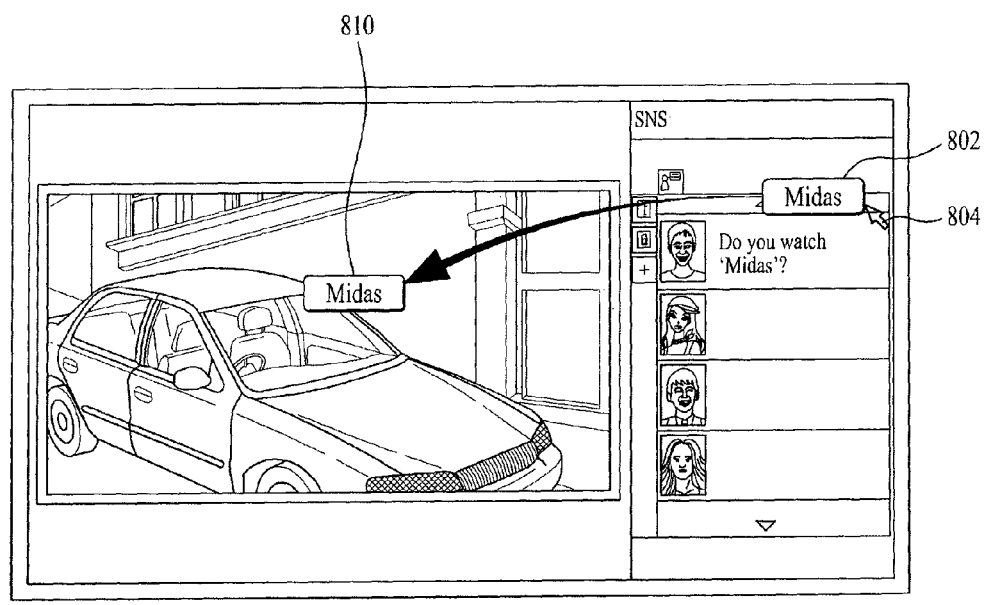
FIGS. 8 to 12 illustrate a procedure of intuitively controlling a digital receiver and an exemplary result of the procedure according to an embodiment of the present invention.

The user can select the first result (e.g., image data) 802 displayed on the screen using a pointer 804 corresponding to the selection mechanism and move the first result 802 to a predetermined region on the screen, as shown in FIG. 8. When the pointing device 804 is used as the selection mechanism, the user can move the first result by selecting the corresponding image data and moving the same through drag & drop.

Referring to FIG. 8, when the user moves the activated image data ('Midas') 810 from the SNS providing area to the broadcast service providing area, the digital receiver can acquire coordinate information about the position to which the image data 810 has been moved.

The digital receiver can determine the position of the moved image data 810 by comparing the acquired coordinate information with previously stored coordinate information in order to determine the type of the second process performed as the user moves the image data 810. When the digital receiver determines that the image data 810 has been moved to the broadcast service providing area, as shown in FIG. 8, from the comparison result, the digital receiver can perform one of the actions illustrated in FIGS. 9 to 12.

Figure 9:
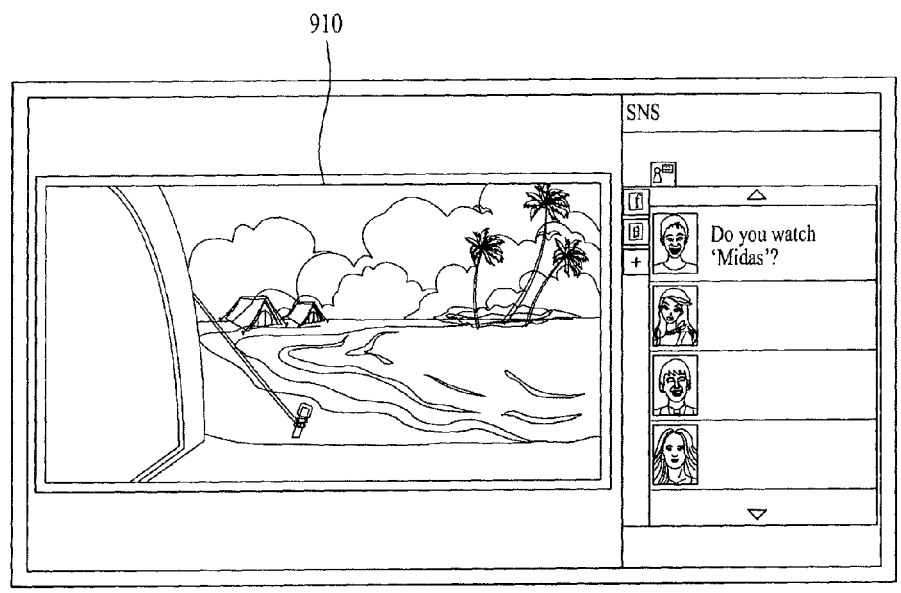

Actions illustrated in FIGS. 9 to 12 are sequentially described. In particular, FIG. 9 illustrates automatic channel change operation according to movement of the image data 810. That is, the digital receiver can display a broadcast program 910 relating to the moved image data 810 instead of the previously provided broadcast program illustrated in FIG. 8.

Specifically, when the image data 810 is moved, the digital receiver can search and tune to the broadcast program or broadcast channel relating to the image data 810 by using various sources, for example, EPG data, or by communicating with an external server according to the second process and perform automatic channel switching on the screen as the second result.

Figure 10:
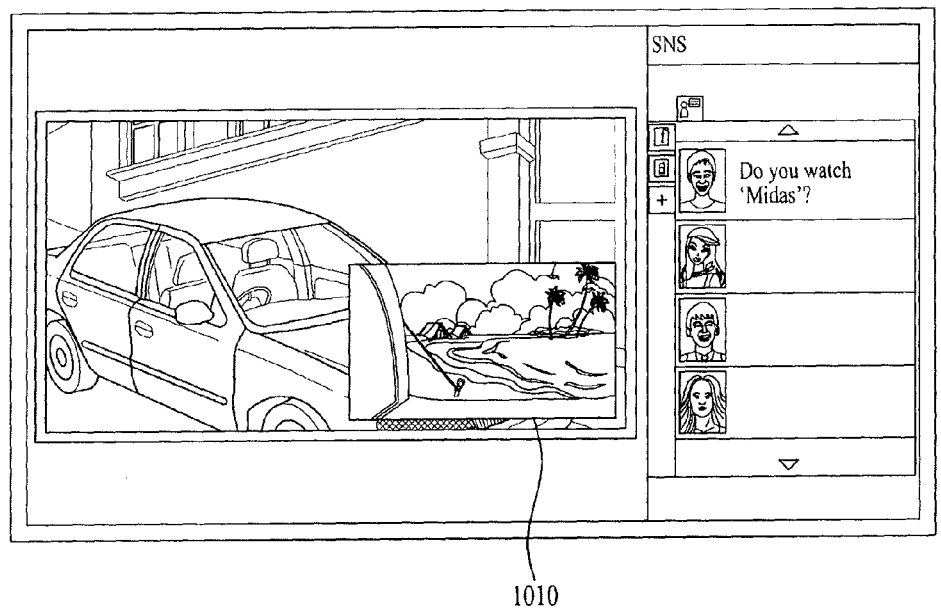

Next, FIG. 10 illustrates a case in which the second process is performed in a manner similar to the above-mentioned method and the second result is provided in the form of PIP (Picture In Picture) or POP (Picture On Picture) 1010 when the user wants to maintain the previous broadcast program or channel. Otherwise, it is possible to provide the broadcast program or channel relating to the image data in which the user is more interested as a main image and to provide the previous broadcast program in the form of PIP or POP. In addition, the main image and PIP image can be switched at the request of the user.

The position of the PIP or POP image as the second result can be controlled such that the PIP or POP image is displayed at the point to which the image data is dropped. Referring to FIG. 10, the PIP image 1010 can be displayed at the lower end of the right of the broadcast service providing area. However, if the first result is moved to the upper end of the left of the broadcast service providing area, the second result, that is, the PIP image 1010 can be provided to the position of the moved first result, that is, to the upper end of the left of the broadcast service providing area.

Figure 11:
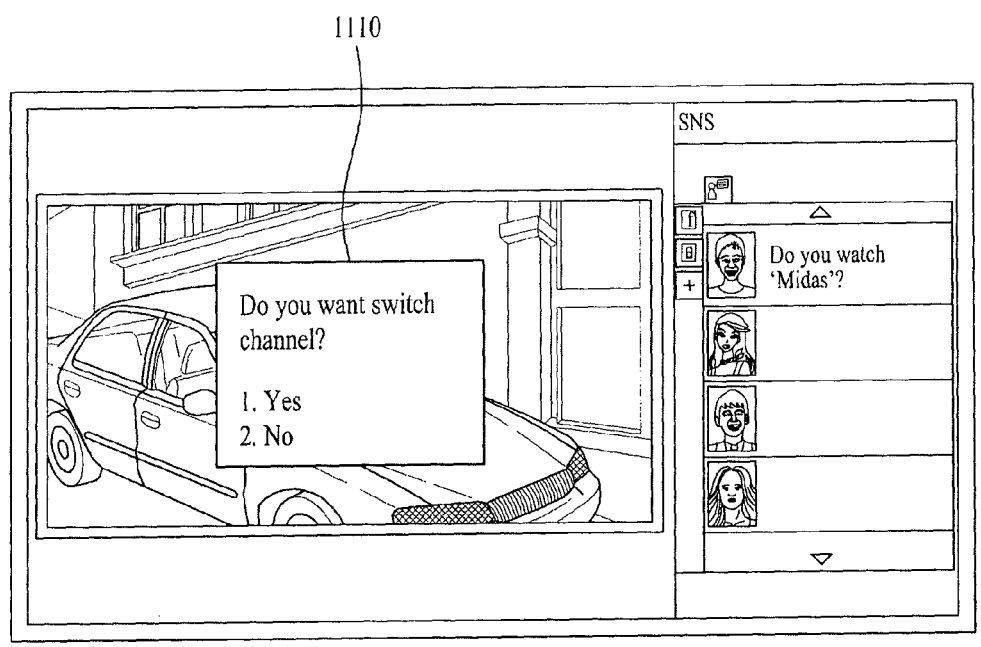

FIG. 11 illustrates a case in which the broadcast program being watched by the user is not automatically switched to the broadcast program with respect to the image data of the broadcast program being watched. Referring to FIG. 11, a UI 1110 can be provided to inquire as to channel change operation, and then the channel change operation can be performed or a PIP can be provided according to a user choice. For example, the UI 1110 "Do you want to switch the current channel?" is provided, and the broadcast program channel regarding the image data can be tuned to when the user selects "yes" so as to provide the corresponding broadcast program.

Figure 12:
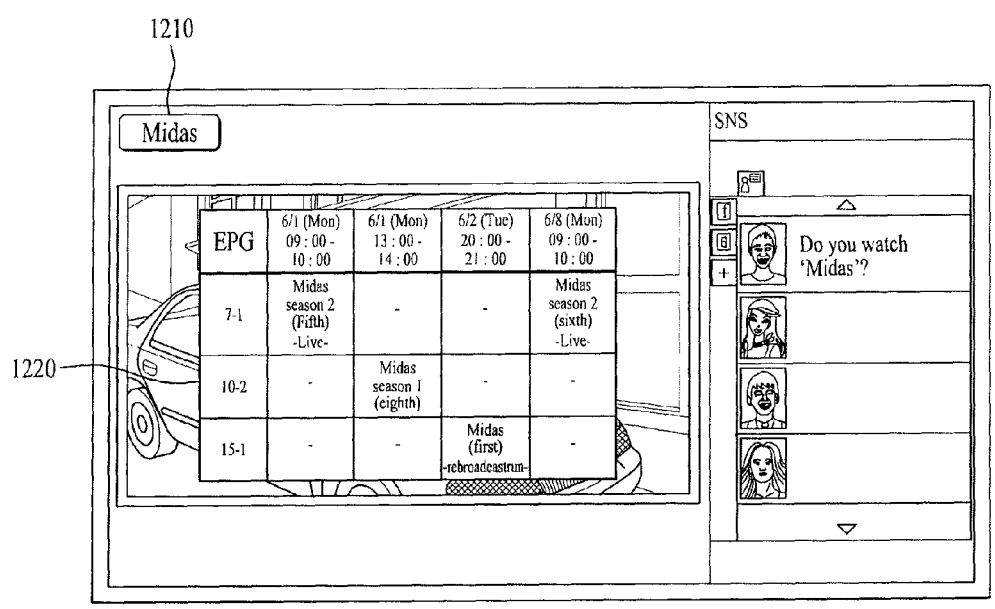

Referring to FIG. 12, when it is determined that the image data has been moved to the broadcast service providing area, the digital receiver can execute an EPG service automatically or at the request of the user to provide an EPG 1220 on the screen. While FIG. 12 shows that the EPG 1220 is displayed on the broadcast service providing area, the EPG 1220 can be provided to various positions. In addition, a list of related data, instead of the EPG, can be provided through an additional UI.

Referring to FIG. 12, the image data 1210 can be displayed above the EPG 1220. FIG. 12 illustrates the EPG 1220 which can display only information about the broadcast program relating to the image data 1210. However, the present invention is not limited thereto. For example, the information about the broadcast program relating to the image data 1210 can be provided with information about other broadcast programs in such a manner that the information about the image data related broadcast program is highlighted, 3D processed, hatched, or displayed in a changed size and/or color so that the user can easily recognize the same.

Furthermore, if a program broadcasting in the same time zone is present, or an image data related program that was broadcast and/or an image data related program scheduled to be broadcast is/are present, the digital receiver can provide a list of the programs, inquire about reservation recording and perform a function according to the response to the inquiry. In this instance, a series of broadcast programs can be programmed. When the user sets reservation recording, setting of reservation recording can be indicated on a predetermined region of the screen and/or EPG such that the user can easily recognize whether or not reservation recording is set.

Alternatively, channel switching and programming can be performed on the EPG provided as shown in FIG. 12. Furthermore, the digital receiver can provide detailed information such as a thumbnail image, a brief summary, actor information, like general EPG even when executing a function according to drag & drop of the image data activated according to the present invention because the digital receiver has already processed and stored EPG data from signaling information such as PSI/PSIP or DVB-SI.

As shown in FIG. 12, the EPG 1220 provided according to the activated image data can cover the broadcast service providing area, which can create user inconvenience. In this instance, the size or resolution of the EPG 1220 can be controlled in the first region. The digital receiver can perform automatic channel switching when one EPG data is searched and provide the list as shown in FIG. 12 when a plurality of EPG data are searched such that an additional function can be executed.

FIGS. 8 to 12 illustrate operations of the digital receiver to determine a function to be performed at the request of the user based on position information of moved image data, in other words, coordinate information, and automatically execute the function.

Figure 13:
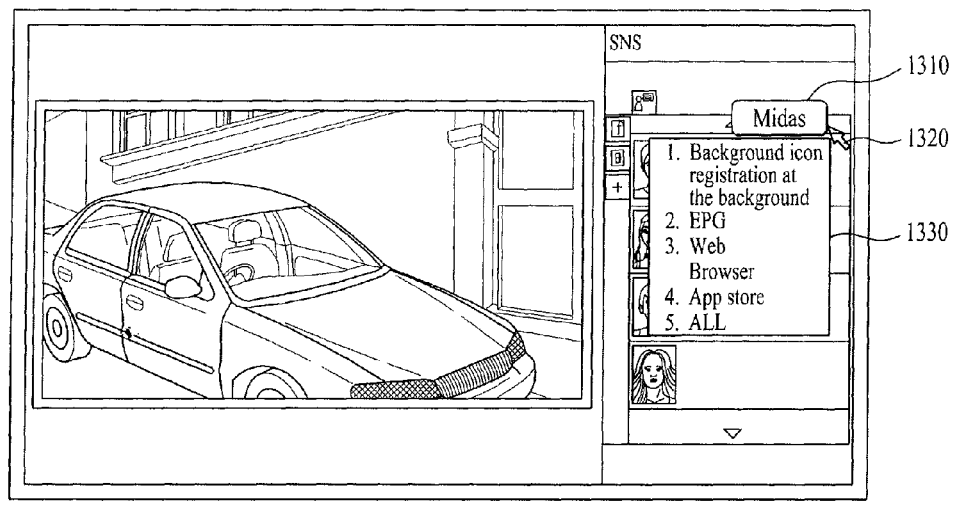
FIG. 13 illustrates a method for controlling a digital receiver according to an embodiment of the present invention.

Next, FIG. 13 illustrates a method for controlling the digital receiver according to another embodiment of the present invention. When the user generates the image data 1310 and accesses the image data 1310 with the pointer 1320, the digital receiver can provide a list 1330 of available functions or services relating to the image data 1310, as shown in FIG. 13.

For example, the list 1330 can include icon registration in the background, execution of an EPG service, execution of web browser service, execution of an App store, and execution of all services. For execution of all services, services can be sequentially executed according to a predetermined order, or results of the services can be simultaneously provided through a UI or OSD. In addition, items relating to various functions that can be provided by the digital receiver may be provided.

Figure 14:
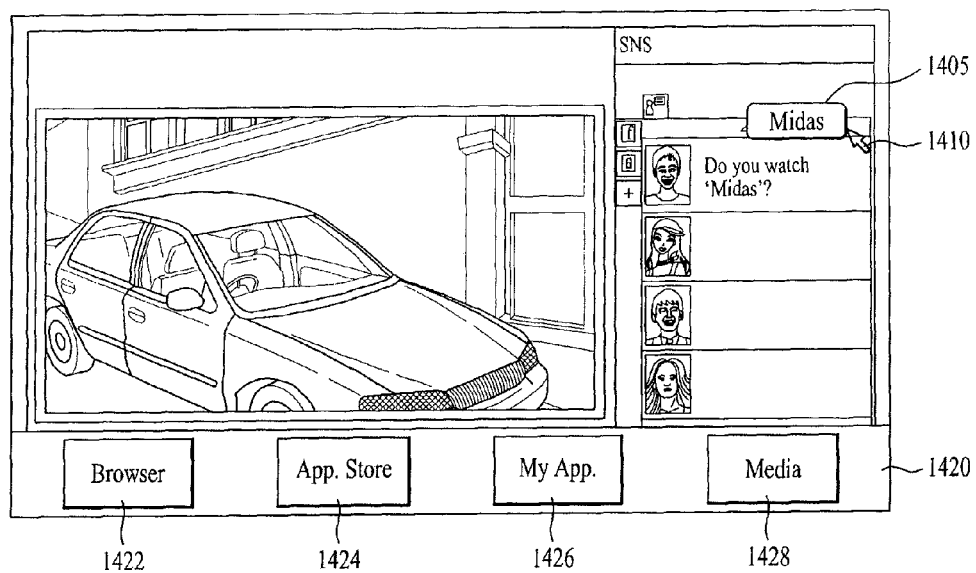
FIGS. 14, 15 and 16 illustrate a method for controlling a digital receiver according to another embodiment of the present invention.
Figure 15:
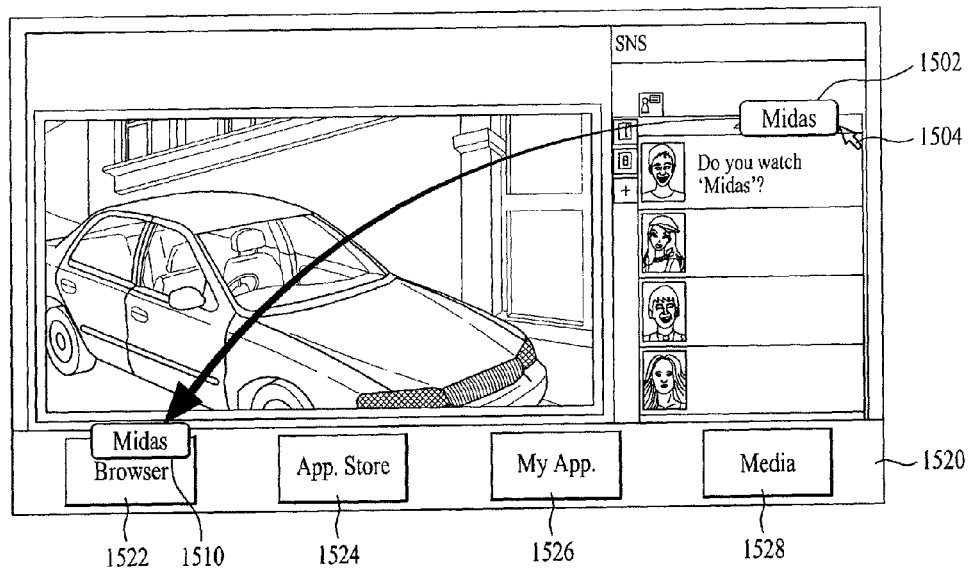
Figure 16:
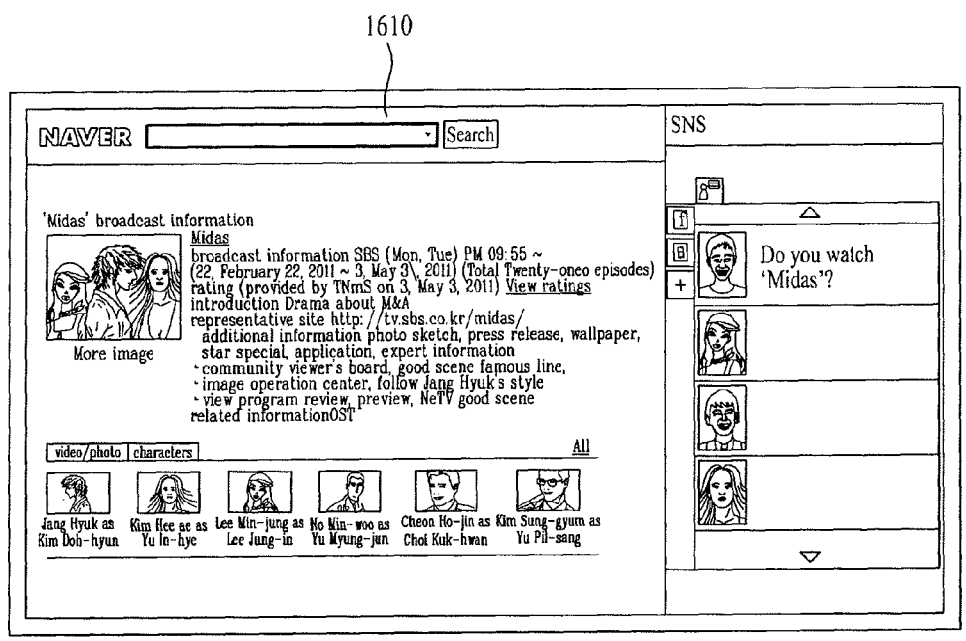

Next, FIGS. 14 to 16 illustrate a method for controlling the digital receiver according to another embodiment of the present invention. Referring to FIG. 14, items 1420 involved in the image data (the first result) 1405 generated through the operations of FIGS. 6 and 7 are displayed on the screen.

Specifically, when the image data 1405 is generated and, at the same time, the image data 1405 is selected by the user, the digital receiver can provide a list 1420 of available functions relating to the image data 1405, which can be provided by the digital receiver, to a predetermined area of the screen. FIG. 14 shows a case in which items for a web browser service 1422, App store service 1424, My App service 1426 and media service 1428 are generated and displayed at the lower end of the screen.

Referring to FIG. 15, the user can move the generated image data 1502 using the pointing device, as shown in FIG. 8. The image data 1502 being moved to the web browser 1522 is described as an example in FIG. 15.

As described above, when the digital receiver senses movement of the image data 1502, the digital receiver can acquire coordinate information about the position to which the image data 1502 has been moved and determine a function linked to the position of the image data and the type or form of the second process by comparing the coordinate information with previously stored coordinate information.

When the digital receiver determines that the position of the moved image data relates to the web browser service 1522, the digital receiver can automatically execute the web browser service as the second process and provide a result relating to the image data 1502, searched through the web browser service, as the second result.

FIG. 16 illustrates a case in which the web browser service is provided on the broadcast service providing area. However, the web browser service can be configured in various sizes and provided to various regions as necessary. Furthermore, when the image data 1502 is moved, the digital receiver can automatically or manually record the broadcast program currently being provided at the request of the user using a time-machine function and provide information about the recording on the screen at the same time as when the broadcast program is recorded or when a function according to movement of the image data 1502 is completed.

Figure 17:
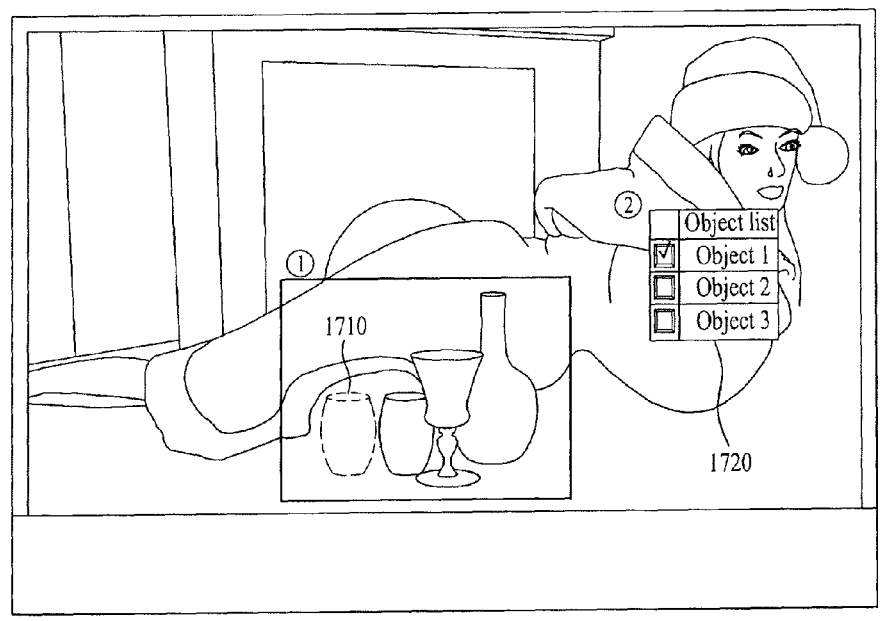
FIGS. 17 and 18 illustrate a method for controlling a digital receiver according to another embodiment of the present invention.
Figure 18:
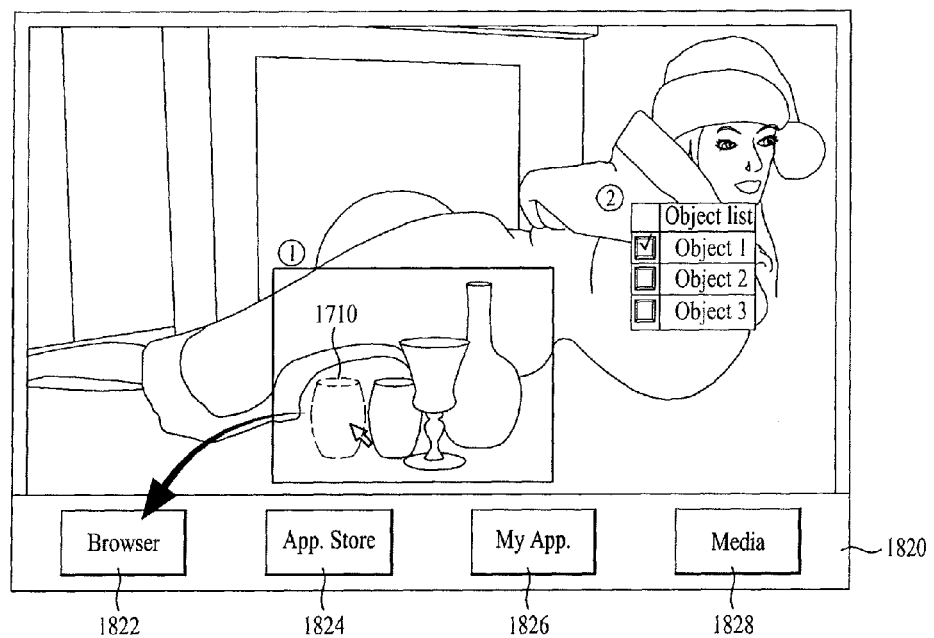

All the above-mentioned embodiments select text data in the SNS and automatically execute functions relating to the text data. However, the present invention is not limited thereto. For example, when an object based data service is provided in a broadcast program, as shown in FIGS. 17 and 18, the digital receiver can be controlled to select an object from the broadcast program, and image and activate the object according to the aforementioned principle. Otherwise, when the user selects specific data on a web browser, the digital receiver can be controller to image and activate the specific data as described above.

In particular, FIGS. 17 and 18 illustrate a method for controlling the digital receiver according to another embodiment of the present invention. FIG. 17 shows a screen on the assumption that only a broadcast program is provided for convenience of description.

The digital receiver can receive data about a plurality of objects which compose one scene from a server and store the received data in advance. In this instance, the user can access a specific object included in the displayed image of the broadcast program provided by the digital receiver. For example, if a rectangular area 1 is selected using a pointing device, as shown in FIG. 17, a selectable object can be displayed, distinguished from other objects, or an object list can be provided in the form of an additional UI.

When the user selects one object 1710, the digital receiver can read data about the object, which has been stored in the memory, draw the read data on OSD to image the data in the form of an icon, which corresponds to the first process, and activate the image data as the first result.

Referring to FIG. 18, when the image data is generated or the user selects the image data 1710 using a pointer, items 1820 for services available in the digital receiver are provided to an area other than the area in which the broadcast program is displayed. The items 1820 can include service items of web browser 1822, App store 1824, My App 1826 and Media 1828, as shown in FIG. 18.

When the user moves the image data 1710 to the web browser item 1822, as shown in FIG. 18, the digital receiver can determine the position to which the image data 1710 has been moved, automatically execute the web browser service as the second process and provide a search result relating to the selected object as the second result.

When the digital receiver automatically executes a specific function based on coordinate information regarding the position of the moved image data, that is, performs the second process, the digital receiver can use data previously read in relation to the image data to execute the function although the image data is moved on the screen. Otherwise, the digital receiver can include text data in an activated image and use the text data without accessing the memory to execute a corresponding function at the same time as when the activated image is moved.

To achieve this, in the process of generating the activated image, the digital receiver can include the text data, read from the memory, in the activated image according to the format of the image, for example, in a header region and/or a data region to generate an image including the text data, thereby performing the corresponding function without accessing the memory.

Alternatively, a text selected on the screen can be moved to a region on the screen through drag & drop to execute a corresponding function. This may correspond to copying text data from one region to another region during a process of dragging and dropping the selected text, for example. In addition, the digital receiver can divide the screen into areas and execute the web browser as shown in FIG. 16. In this instance, a search provider for a search operation may be a default site previously set in the digital receiver. The user can change the search site.

Furthermore, when the user moves the activated image data to the App store service, which is not shown in the figure, the digital receiver can search the App store for applications related to the image data and provide a related application or a list of the related applications.

When the user moves the activated image data to My App service, the digital receiver can search My App for a related application and execute the application, or execute similar applications or provide a list of similar applications when similar applications are present. When the user moves the activated image data to the media service, the digital receiver can search the media and provide a related list. The media may include USB, DLNS, recording list, etc.

When the user moves an image, which is selected through another service and activated, to SNS, the digital receiver can search friends or texts linked for the SNS and provide information about them. The SNS may include Twitter, Facebook, me2day, etc.

Figure 19:
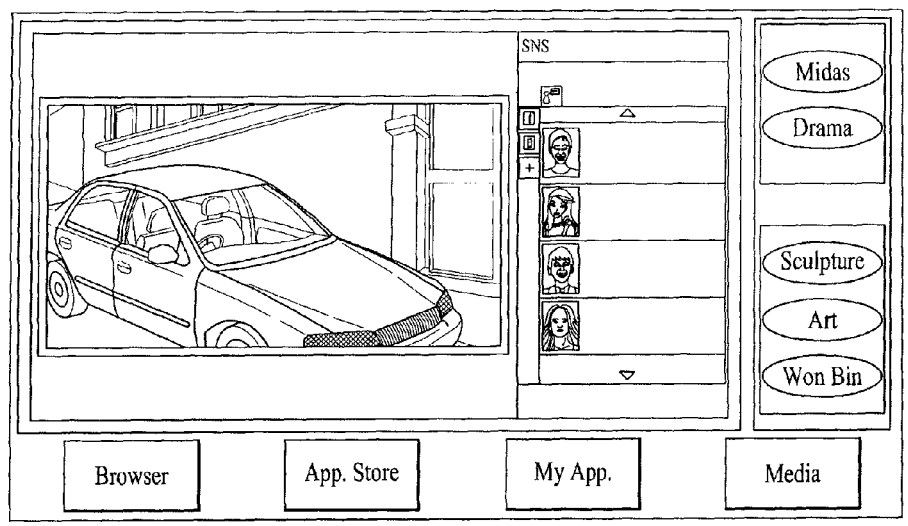
FIGS. 19 and 20 illustrate a method for providing a tray in a specific mode and searching information through the tray.
Figure 20:
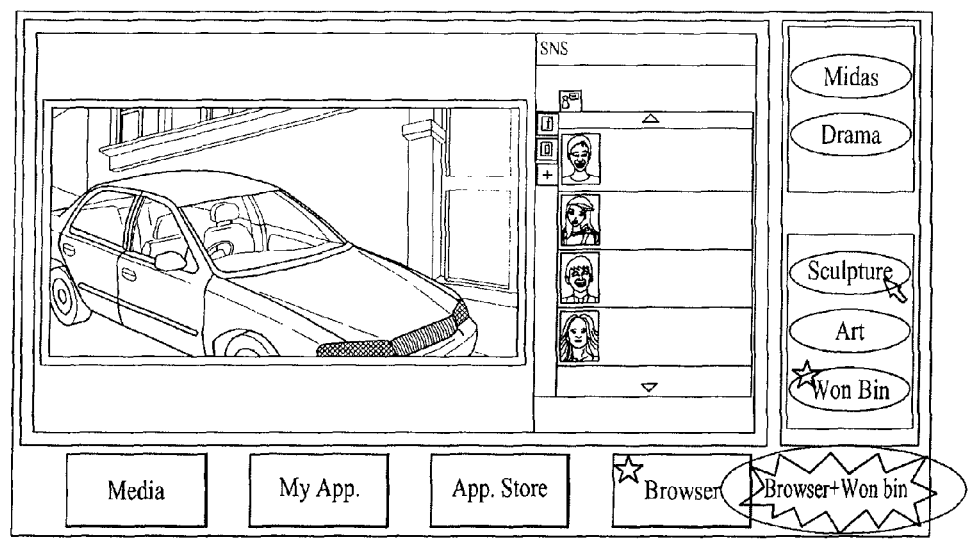

A case in which a specific mode is executed as the first process will now be described. In particular, FIGS. 19 and 20 illustrate a method for providing a tray and searching information through the tray in a specific mode according to an embodiment of the present invention. Parts of description of the execution of a specific mode as the first process, which are similar or identical to the aforementioned corresponding parts, are omitted and different parts of the description will be explained.

In FIGS. 19 and 20, a specific area or data may be selected in a manner similar to the embodiment shown in FIG. 6. However, the first result, obtained by performing the first process when the area or data is selected, can be provided in the form of a tray, as shown in FIGS. 19 and 20. For example, the size and resolution of the previous screen, that is, the broadcast service providing area and SNS providing area may be adjusted and the result of the first process, that is, the first result is provided in the form of a tray to an area generated by adjustment of the size and resolution of the previous screen, distinguished from the aforementioned method of directly providing the first result as image data. Here, the tray means a collection of areas or data selected to be activated. As described above, the tray may be configured in the form of image data or in the form of audio, video or text data.

Referring to FIG. 19, when the first process is performed as the user selects a specific area or data, the size and resolution of the currently displayed OSD image (broadcast service providing area+SNS providing area) may be adjusted and the tray may be provided to an area generated caused by such adjustment. Information about various sources and search engines relating to the tray can be displayed at the lower end of the screen.

Referring to FIG. 19, the tray can display data such as 'Midas', drama, sculpture, art, and 'Won Bin', which correspond to areas or data selected from the broadcast service providing area or the SNS providing area. The digital receiver can provide a tray including various formats or information. For example, when the user selects one area or data, the digital receiver can extract tray data relating to the selected area or data from previously stored tray data and provide the extracted tray data. In addition, the digital receiver can align the tray data based on various standards, for example, in the order of time, genre, ratings, rating information, user's setting information, etc.

Data provided through the tray may have different forms, formats, images and sizes and be configured in various manners. For example, the data can be highlighted, displayed in changed colors, or displayed as 3D data. Furthermore, the data provided through the tray may be selected as described above and activated such that it can be dragged and dropped.

Referring to FIG. 20, when the user selects tray data "Won Bin" from the tray and selects a browser from search engines, a quick search icon can be configured and provided for the second process. When the user selects the quick search icon, the second process can be performed and data acquired by searching the browser for "Won Bin" is be provided as the second result. The second result can be provided in the form as shown in FIG. 16 because the browser is used as a search engine.

While the quick search icon can be configured as described above, it can be configured by dragging and dropping the tray data "Won bin" onto the browser. The search engines displayed at the lower end of the screen can be arranged according to types and kinds of the tray data in such a manner that the search engine recommended by the digital receiver can be displayed on the right, that is, at the shortest access distance. For example, if the digital receiver determines that the browser is most suitable as a search engine of the tray data "Won Bin" from among the search engines, media, My App, App store and browser, the digital receiver can align the search engines such that the browser can be closest to the tray so as to allow the user to recognize the recommended search engine and rapidly access the recognized search engine. The other search engines can be arranged according to their priorities determined in relation with the tray. When specific tray data is designated for a predetermined time, the digital receiver can display a UI including a search engine list around the specific tray data in a manner similar to that shown in FIG. 13.

Tray data can be configured in various forms such that it can be easily recognized and can include text data. Furthermore, the tray data can be focused, or a UI such as a list of information relating to the tray data or detailed information on the tray data can be provided when the tray data is accessed.

The digital receiver can automatically configure and provide the quick search icon when the tray is provided. For example, if the user selects the area or data corresponding to "Won Bin" through SNS, the digital receiver can configure the tray, as shown in FIGS. 19 and 20, and at the same time, automatically configure the quick search icon by combining selected data and a search engine most recommendable for the selected data, and perform the second process at the request of the user to output the second result or carry out the second process according to setting when the user does not select execution of the second process to output the second result.

As to the tray provided as shown in FIGS. 19 and 20, when the first result of the first process is provided as described above and the user moves the first result to a predetermined position, the tray can be provided based on the position. For example, when the user moves the first result to a region other than areas in which the broadcast service and search engines are displayed, the tray can be provided as shown in FIGS. 19 and 20. Otherwise, when the first result accesses the boundary of a text or an object icon, a specific mode can be executed and the tray can be provided in the executed specific mode.

Figure 21:
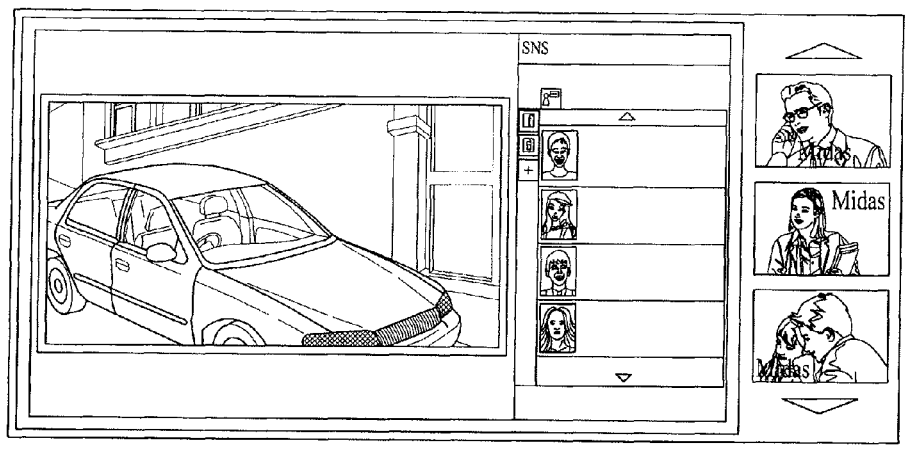
FIGS. 21 to 23 illustrate a method for providing a second result obtained according to the method illustrated in FIGS. 19 and 20.
Figure 22:
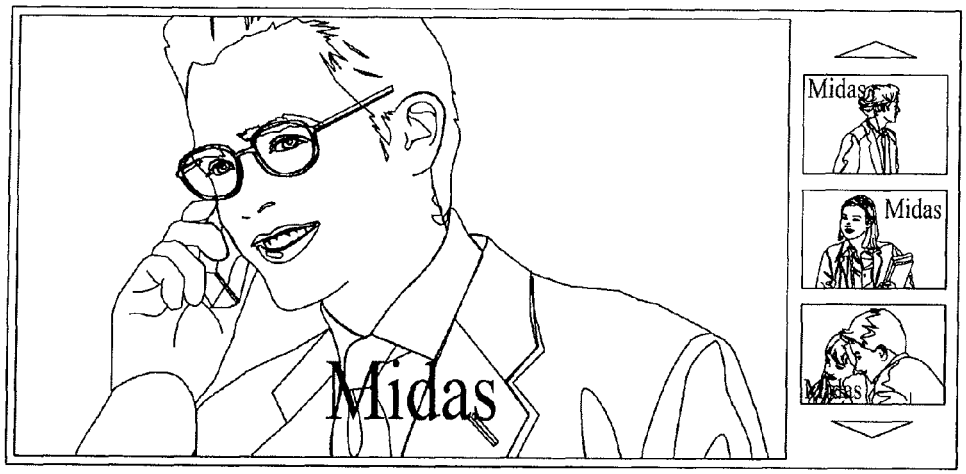
Figure 23:
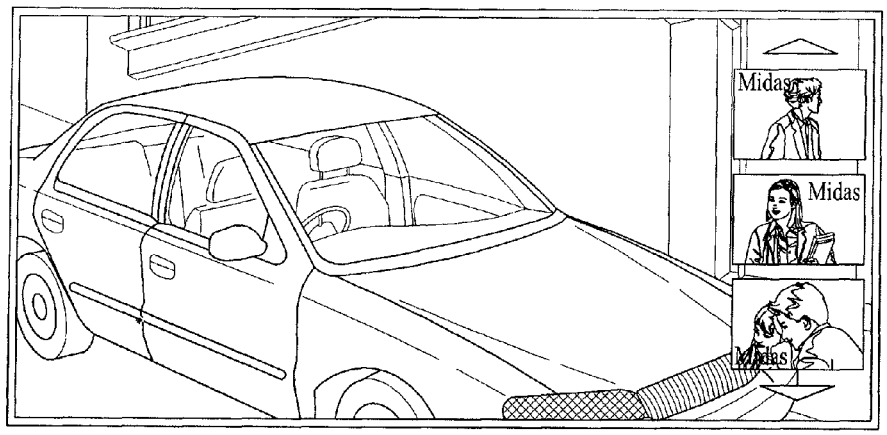

FIGS. 21 to 23 illustrate a method for providing the second result according to the method illustrated in FIGS. 19 and 20. Referring to FIG. 21, if a quick search result of the operation shown in FIG. 20 corresponds to thumbnail images, the quick search result can be displayed on the tray with the broadcast program image displayed. In this instance, if a plurality of data is present, the quick search result can be provided in a vertical or horizontal scrolling manner such that it can be accessed according to the tray format.

FIG. 22 illustrates a thumbnail image which is selected from the tray according to the quick search result shown in FIG. 21 and magnified to the full screen. In this instance, the magnified thumbnail image can be selected by the user, or a thumbnail image recommended by the digital receiver can be provided to be magnified. Otherwise, thumbnail images can be provided in a slide form and upon completion of the last thumbnail image, the previous image can be recovered.

Referring to FIG. 23, a quick-searched second result can be provided in the form of PIP or POP on the screen. The scenes shown in the figures can be automatically provided according to setting of the user, user choice before window change, and priority determined by the digital receiver. When an image is provided, audio data of a previous service can be maintained. For example, when a thumbnail image is displayed on the full screen, as shown in FIG. 22, the audio data of the previous broadcast service can be continuously provided.

If audio data linked with the thumbnail image is received during the quick search process, the audio data of the previous broadcast service can be automatically stopped and the received audio data can be automatically reproduced while the thumbnail image is provided. For example, the thumbnail image may correspond to a poster of a drama or movie and a soundtrack, that is, a theme of the drama or movie has been searched during the quick search process, the soundtrack may be provided along with the thumbnail image. Data about lyrics of the audio data can be received and provided during the quick search process.

When a searched result is audio data, the digital receiver can determine whether or not to automatically reproduce the audio data based on the length or quantity of the audio data. For example, if the reproduction time of searched audio data is within 1 minute, the audio of the previous service may be muted and the audio data may be automatically reproduced. If the reproduction time exceeds 1 minute, the user can select reproduction of the audio data.

While a display image is changed when the second result is provided in the above embodiments, it is possible to determine a most suitable screen division states, such as division into two, three or four areas according to various standards and appropriately provide the second result through the divided screen areas.

Furthermore, different processes can be respectively performed for a case in which the user drags the first result to a predetermined region and a case in which the user drags and drops the first result. For example, when the user drags the first result to the broadcast service providing area and maintains the dragged first result without dropping it, the digital receiver can automatically execute EPG at the dragged point or provide detailed information about the currently provided broadcast program such that the user can determine whether the currently provided broadcast program may be maintained or switched so as to determine whether or not to drop the dragged first result.

When a service according to a search result is provided, this service may collide with the previous service. For example, when the search result is audio data, audio data of the previous service can collide with the audio data of the search result when both are reproduced. In this instance, if reproduction of the audio data of the previous service needs to be stopped, a time-machine function can be provided automatically or manually.

When the search result corresponds to a stored application, screen configuration may vary with the feature, type and category of the application. For example, if the application is a game, a large screen may be needed according to the attribute or category of the game. In this instance, the digital receiver can configure the screen such that the game application is displayed in full screen according to the attribute of the game. Even when the game application is displayed in full screen, the previous service can be provided in the form of PIP or POP. If it is determined that the game application needs not be displayed in full screen in consideration of the attribute or category of the game application, the screen can be divided into areas in predetermined sizes in consideration of correlation between the game application and the previous service and the game application and the previous service can be simultaneously provided. In this instance, audio collision can be solved automatically or manually.

The digital receiver may need not search one search data (including tray data) through one search engine. In other words, the search data can be simultaneously searched through a plurality of search engines to provide a search result. Otherwise, a plurality of search data (a combination of data or individual data) can be searched through one or more search engines to provide a search result. In this instance, when a plurality of search results is present, the digital receiver can divide the screen into multiple areas and simultaneously provide the plurality of search results through the multiple areas, or sequentially provide the search results according to their priorities.

Figure 24:
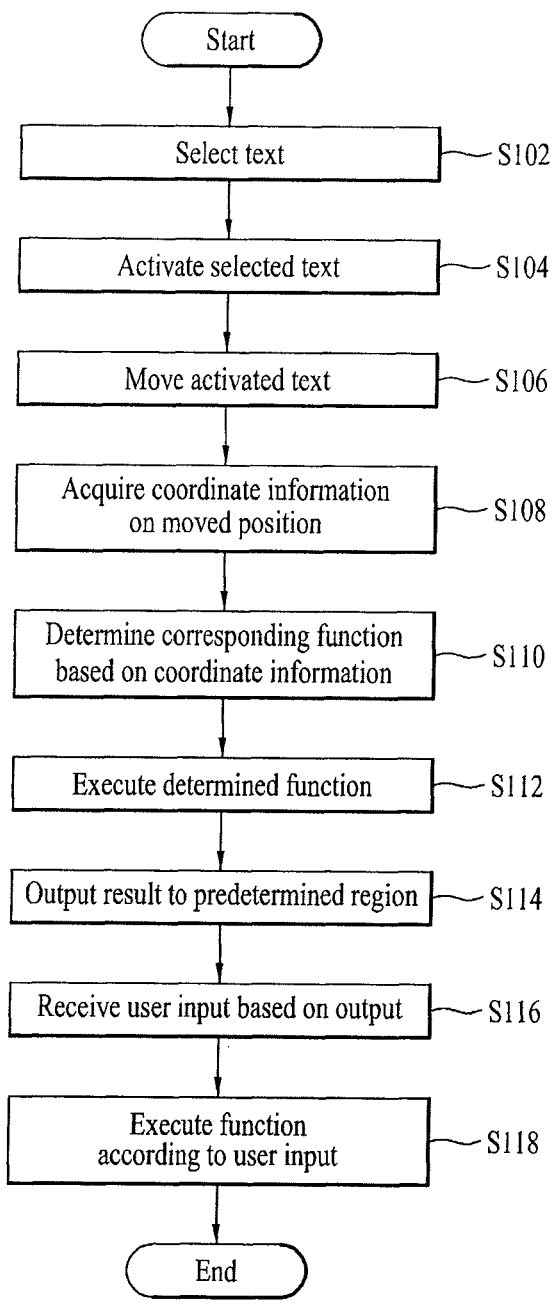
FIG. 24 is a flowchart illustrating a method for controlling a digital receiver according to an embodiment of the present invention.

FIG. 24 is a flowchart illustrating a method for controlling the digital receiver according to an embodiment of the present invention. When the user selects a specific area or data displayed on the screen using a selection mechanism (S102), the digital receiver can perform the first process to output activated data corresponding to the selected area or data (S104).

When the user moves the activated data to a boundary region of the screen (S106), the digital receiver can execute a specific mode as the second process (S108). Here, the specific mode may mean an operation of providing a tray including a collection of the activated data to a first region from a spare region generated by adjustment of the size and resolution of the entire screen configured prior to the first process.

The digital receiver can further output information on one or more search engines relating to the specific mode to a second region from the spare region (S110). The digital receiver can further output a quick search icon configured according to a combination of predetermined data selected from tray data and a predetermined search engine selected from the search engines to a third region from the spare region (S112).

When the quick search icon is accessed, a search result obtained by searching the corresponding tray data using the corresponding search engine can be displayed on the screen. Whether or not the displayed image data corresponding to the search result accesses the boundary region of the screen can be determined based on coordinate information about screen configuration.

The activated data and tray data may be at least one of text data, audio data, video data, and image data. If the activated data and tray data correspond to image data, they can be configured in at least one of BMP, JPG, JPEG and PNG formats.

Figure 25:
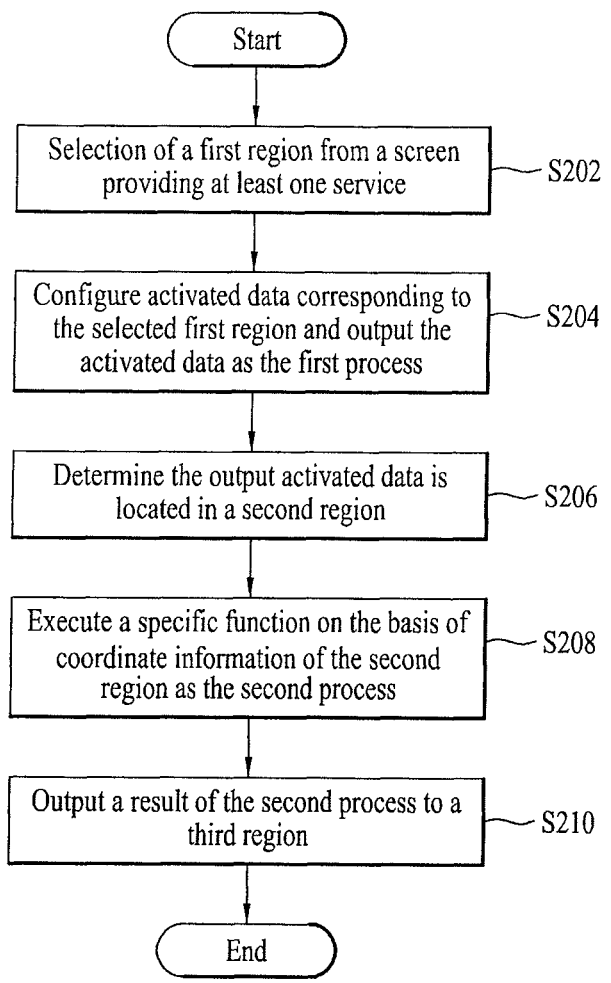
FIG. 25 is a flowchart illustrating a method for controlling a digital receiver according to another embodiment of the present invention.

FIG. 25 is a flowchart illustrating a method for controlling the digital receiver according to another embodiment of the present invention. Upon selection of a first region from a screen providing at least one service (S202), the digital receiver can configure activated data corresponding to the selected first region and outputs the activated data as the first process (S204).

When the output activated data is located in a second region (S206), the digital receiver can execute a specific function based on coordinate information of the second region as the second process (S208). The digital receiver can output a result of the second process to a third region (S210).

The first region can correspond to at least one of text data, image data, and object data according to corresponding service, and the specific function can correspond to one of a web browser, App store, My App, media and a tray function.

According to the aforementioned embodiments of the present invention, the digital receiver can provide a user interface by which the user can access or execute desired information or a desired function more easily and rapidly. To achieve this, when the user selects a specific area or data from the screen, the digital receiver can perform the first process for call and application of a function or information relating to the selected area or data and automatically/manually carry out the second process based on user control, such as an action or request of the user for a result of the first process. Furthermore, a user interface for executing the same information or function as the above-mentioned one can be provided for additional services such as SNS in addition to the broadcast service to control the digital receiver. Accordingly, it is possible to provide intuitive results by executing a desired function without going through several paths or without directly typing the desired function and to execute information or functions according to the results. This allows the user to easily access and use the digital receiver, thereby increasing the user's purchasing needs.

In addition, the above embodiments describe displaying results of executing the browser, app store, etc. using the converted/generated image data in the main or first display area. However, in an alternative embodiment, if the broadcast program being displayed in the first display region is a favorite broadcast program, the favorite broadcast program can be continuously displayed program and the results can be displayed as part of the continuously displayed program (e.g., as a PIP, as overlaid transparently, etc.). Also, if the broadcast program being displayed in the first display region is not the favorite broadcast program, the results can be displayed as a full screen in the first display region.

Further, in still another embodiment, if the results include audio or video, a length of the audio or video can be first determined. Then, if the length of the audio or video is less than a predetermined amount, the audio or video can be directly output. However, if the length of the audio or video is equal or greater than the predetermined amount, the audio or video can be selectively output based on the program being displayed in the first display region. For example, if the program being displayed in the first display region is a commercial and the length of the audio or video is less than or equal to the remaining time left in the commercial, the audio or video can be directly output during the commercial. Whether the program is a favorite program can also be considered. Only select portions of the audio or video can also be output. An amount of motion (e.g., between frames) can also be determined, and then the audio or video can be output selectively based on the motion of the program.

Also, if the length of the audio or video is equal or greater than a predetermined amount, only select portions of the audio or video that are most related to the converted image data can be output.

The digital receiver and operating method thereof according to the present invention are not limited to the aforementioned embodiments, and all or some of the embodiments can be selectively combined such that the embodiments can be modified in various manners.

The operating method of the digital receiver according to the present invention can be embodied as computer readable code on a computer readable medium. The computer readable medium is any data storage device that stores data which can be read by a computer system. Examples of the computer readable medium include read-only memory (ROM), random-access memory (RAM), CD-ROM, magnetic tape, floppy disk, optical data storage devices, and so on. The computer readable medium can also be embodied in the form of carrier waves as signals communicated over the Internet. The computer readable medium can also be distributed over a network of coupled computer systems so that the computer readable code is stored and executed in a distributed fashion.

Although the present invention has been described with reference to the limited embodiments and the drawings, the present invention is not limited to the embodiments and those skilled in the art will be able to make various modifications and changes from the description. Accordingly, the scope of the present invention should not be determined by the above description but should instead be determined by not only the appended claims but also equivalents to the claims.

What is claimed is:

1. A method of controlling a digital apparatus, the method comprising:
   displaying, on a display, a first display region and a second display region, said first display region configured to display a first content and said second display region displaying social network contents, wherein the first and second display regions are not overlapped in the display;
   receiving, via an input unit, a selection signal indicating a selection of a part of the displayed social network contents included in the second display region;
   converting, via a controller, the selected part of the social network contents into image data;
   receiving, via the input unit, a moving signal indicating a movement of the converted image data on the display; and executing, via the controller, a predetermined action corresponding to the received moving signal, wherein, if the converted image data is moved into any area included in the first display region, the predetermined action is any one of switching displaying the first content to a second content corresponding to the converted image data, displaying the second content in a picture in picture (PIP) window, and displaying a service guide including one or more contents corresponding to the converted image data, wherein, if the converted image data is moved into a specific area of the display, the predetermined action is displaying a third display region including a list including one or more converted image data, the one or more converted image data including previously converted and stored image data and currently converted image data, the specific area not including the first and second display regions, displaying a fourth display region including one or more icons representing one or more applications, which are available and related to the list included in the third display region on the digital apparatus, wherein, if a converted image data included in the list is moved into an icon among the one or more icons displayed in the fourth display region, the predetermined action is creating a quick search application icon in response to moving the converted image data of the third display region into the icon of the fourth display region, and wherein the third and fourth display regions are displayed with the first and second display regions on the display at the same time.

2. The method of claim 1, wherein the selected part of the social network contents includes chat text contents input received from a social network contents server.

3. The method of claim 1,
wherein the one or more applications includes a browser application, an application store, a user defined application and a media application.

4. The method of claim 3, wherein if the moving signal indicates the converted image data is being moved from the second display region into the fourth display region, the executing step executes one of the browser application, the application store, the user defined application and the media application that the converted image data is moved to.

5. The method of claim 4, further comprising:
displaying, on the display, results of the executing step in the first display region.

6. The method of claim 5, further comprising:
if the results of the executing step include audio or video, determining a length of the audio or video;
if the length of the audio or video is less than a predetermined amount, outputting the audio or video; and
if the length of the audio or video is equal or greater than the predetermined amount, selectively outputting the audio or video based on the first content being displayed in the first display region.

7. The method of claim 5, further comprising:
if the results of the executing step include audio or video, determining a length of the audio or video;
if the length of the audio or video is equal or greater than a predetermined amount, selectively outputting only select portions of the audio or video that are related to the converted image data.

8. The method of claim 3, further comprising:
receiving a selection signal indicating a selection of an object included in the first content displayed in the first region;
receiving a moving signal indicating a movement of the selected object to the fourth display region; and
executing one of the browser application, the application store, the user defined application and the media application that the selected object is moved to.

9. The method of claim 1, further comprising:
reducing a display size of the first and second display regions for displaying the third and fourth display regions.

10. A digital apparatus, comprising:
a display configured to display a first display region and a second display region, said first display region configured to display a first content and said second display region displaying social network contents, wherein the first and second display regions are not overlapped in the display;

an input unit configured to receive a selection signal indicating a selection of a part of the displayed social network contents included in the second display region; and a controller configured to:
convert the selected part of the social network contents into image data, receive a moving signal indicating a movement of the converted image data on the display, and
execute a predetermined action corresponding to the received moving signal, wherein, if the converted image data is moved into any area included in the first display region, the predetermined action is any one of switching displaying the first content channel to a second content corresponding to the converted image data, displaying the second content in a picture in picture (PIP) window, and displaying a service guide including one or more contents corresponding to the converted image data, wherein if the converted image data is moved into a specific area of the display, the predetermined action is to display a third display region including a list including one or more converted image data, the one or more converted image data including previously converted and stored image data and currently converted image data, the specific area not including the first and second display regions, displaying a fourth display region including one or more icons representing one or more applications, which are available and related to the list included in the third display region on the digital apparatus, wherein, if a converted image data included in the list is moved into an icon among the one or more icons displayed in the fourth display region, the predetermined action is creating a quick search application icon in response to moving the converted image data of the third display region into the icon of the fourth display region, and wherein the third and fourth display regions are displayed with the first and second display regions on the display at the same time.

11. The mobile terminal of claim 10,
wherein the one or more applications includes a browser application, an application store, a user defined application and a media application.

* * * * *